US 12,197,993 B2

(12) United States Patent
Biswas et al.

(10) Patent No.: US 12,197,993 B2
(45) Date of Patent: Jan. 14, 2025

(54) METHODS AND SYSTEMS OF MESH CONFIGURATION OF RADIO FREQUENCY IDENTIFICATION (RFID) COMMUNICATION

(71) Applicant: Hand Held Products, Inc., Charlotte, NC (US)

(72) Inventors: Gourango Lal Biswas, Charlotte, NC (US); Pankaj Kumar Pandey, Charlotte, NC (US); Sandeep Suresh, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/432,434

(22) Filed: Feb. 5, 2024

(65) Prior Publication Data

US 2024/0176966 A1 May 30, 2024

Related U.S. Application Data

(63) Continuation of application No. 17/663,986, filed on May 18, 2022, now Pat. No. 11,922,255.

(30) Foreign Application Priority Data

May 19, 2021 (IN) .............................. 202111022397

(51) Int. Cl.
*G06K 7/10* (2006.01)
*G06K 19/07* (2006.01)
*G06K 19/077* (2006.01)

(52) U.S. Cl.
CPC ..... *G06K 7/10366* (2013.01); *G06K 19/0723* (2013.01); *G06K 19/07773* (2013.01)

(58) Field of Classification Search
CPC .......... G06K 7/10366; G06K 19/0723; G06K 19/07773
(Continued)

(56) References Cited

U.S. PATENT DOCUMENTS 11,030,429 B2 6/2021 Turner et al.
2010/0271187 A1 10/2010 Uysal et al.
(Continued)

OTHER PUBLICATIONS

U.S. Appl. No. 17/663,986, filed May 18, 2022, U.S. Pat. No. 11,922,255, Issued.
(Continued)

*Primary Examiner* — Allyson N Trail
(74) *Attorney, Agent, or Firm* — Alston & Bird LLP

(57) ABSTRACT

Various embodiments illustrated herein disclose a radio-frequency identification (RFID) reader having a first RFID tag having a first antenna element operating at a first transmit power. The first RFID tag receives, in a first time interval, a first interrogation command from a first RFID reader through the first antenna element. The first RFID tag transmits, in the first time interval, a first response signal to the first RFID reader. The RFID reader comprises a second antenna element that operates at a second transmit power and a processor communicatively coupled to the second antenna element. The processor transmits, in the first time interval, a second interrogation command to one or more second RFID tags through the second antenna element. The first RFID tag transmits, in a second time interval, a third interrogation command to a first RFID tag of a second RFID reader through the first antenna element.

20 Claims, 16 Drawing Sheets

(58) Field of Classification Search
USPC .......................................................... 235/451
See application file for complete search history.

(56) References Cited

U.S. PATENT DOCUMENTS

2021/0225134 A1  7/2021  Mori et al.
2023/0177287 A1  6/2023  Austin

OTHER PUBLICATIONS

Notice of Allowance and Fees Due (PTOL-85) Mailed on Nov. 3, 2023 for U.S. Appl. No. 17/663,986, 8 page(s).

METHODS AND SYSTEMS OF MESH CONFIGURATION OF RADIO FREQUENCY IDENTIFICATION (RFID) COMMUNICATION

CROSS-REFERENCE TO RELATED APPLICATIONS

This application is a continuation of U.S. patent application Ser. No. 17/663,986, filed May 18, 2022, titled "Methods And Systems Of Mesh Configuration Of Radio Frequency Identification (RFID) Communication," which claims priority pursuant to 35 U.S.C. 119(a) to India Patent Application No. 202111022397, filed May 19, 2021, each of which is incorporated herein by reference in its entirety.

TECHNICAL FIELD

Example embodiments of the present disclosure relate generally to radio-frequency identification (RFID) communication and, more particularly, to methods and systems of mesh configuration of RFID communication.

BACKGROUND

A RFID system may be at least used for asset tracking, where one or more RFID tags may be placed on one or more assets that are to be tracked by a large number of RFID readers covering large geographically distributed critical zones corresponding to a work environment such as, a hospital, a warehouse, a store, etc. For example, the RFID system may include multiple RFID readers that may be positioned at fixed locations in the work environment (where the one or more assets are to be tracked). These multiple RFID readers spread about a vast work environment are typically connected to a backend server using RF cables.

BRIEF SUMMARY

Various embodiments illustrated herein disclose a radio-frequency identification (RFID) reader. The RFID reader comprises a first RFID tag comprising a first antenna element. The first antenna element is configured to operate at a first transmit power. The first RFID tag receives, in a first time interval, a first interrogation command from a first RFID reader through the first antenna element. In response to receiving the first interrogation command, the first RFID tag transmits, in the first time interval, a first response signal to the first RFID reader. The RFID reader comprises a second antenna element that operates at a second transmit power. The second transmit power of the second antenna element is below the first transmit power of the first antenna element. The RFID reader comprises a processor communicatively coupled to the second antenna element. The processor transmits, in the first time interval, a second interrogation command to one or more second RFID tags through the second antenna element. The processor receives a second response signal from the one or more second RFID tags in the first time interval through the second antenna element, in response to transmitting the second interrogation command. The first RFID tag transmits, in a second time interval, a third interrogation command to a first RFID tag of a second RFID reader through the first antenna element operating at the first transmit power. The second time interval occurs subsequent to the first time interval. The first RFID tag of the RFID reader receives, in the second time interval, a third response signal from the second RFID reader.

Various embodiments illustrated herein disclose a method that includes receiving, by a first RFID tag of an RFID reader, through a first antenna element of the RFID reader in a first time interval, a first interrogation command from a first RFID reader. The first antenna element operates at a first transmit power. The method includes transmitting, by the first RFID tag, in the first time interval, a first response signal to the first RFID reader, in response to receiving the first interrogation command. The method includes transmitting, by a processor of the RFID reader, in the first time interval, a second interrogation command to one or more second RFID tags through a second antenna element of the RFID reader. The second antenna element operates at a second transmit power that is below the first transmit power of the first antenna element. The method further includes receiving, by the processor of the RFID reader, a second response signal from the one or more second RFID tags in the first time interval through the second antenna element, in response to transmitting the second interrogation command. The method further includes transmitting, by the first RFID tag of the RFID reader, in a second time interval, a third interrogation command to a first RFID tag of a second RFID reader through the first antenna element operating at the first transmit power. The second time interval occurs subsequent to the first time interval. The method further includes receiving, by the first RFID tag, in the second time interval, a third response signal from the second RFID reader.

The foregoing illustrative summary, as well as other exemplary objectives and/or advantages of the disclosure, and the manner in which the same may be accomplished, may be further explained in the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
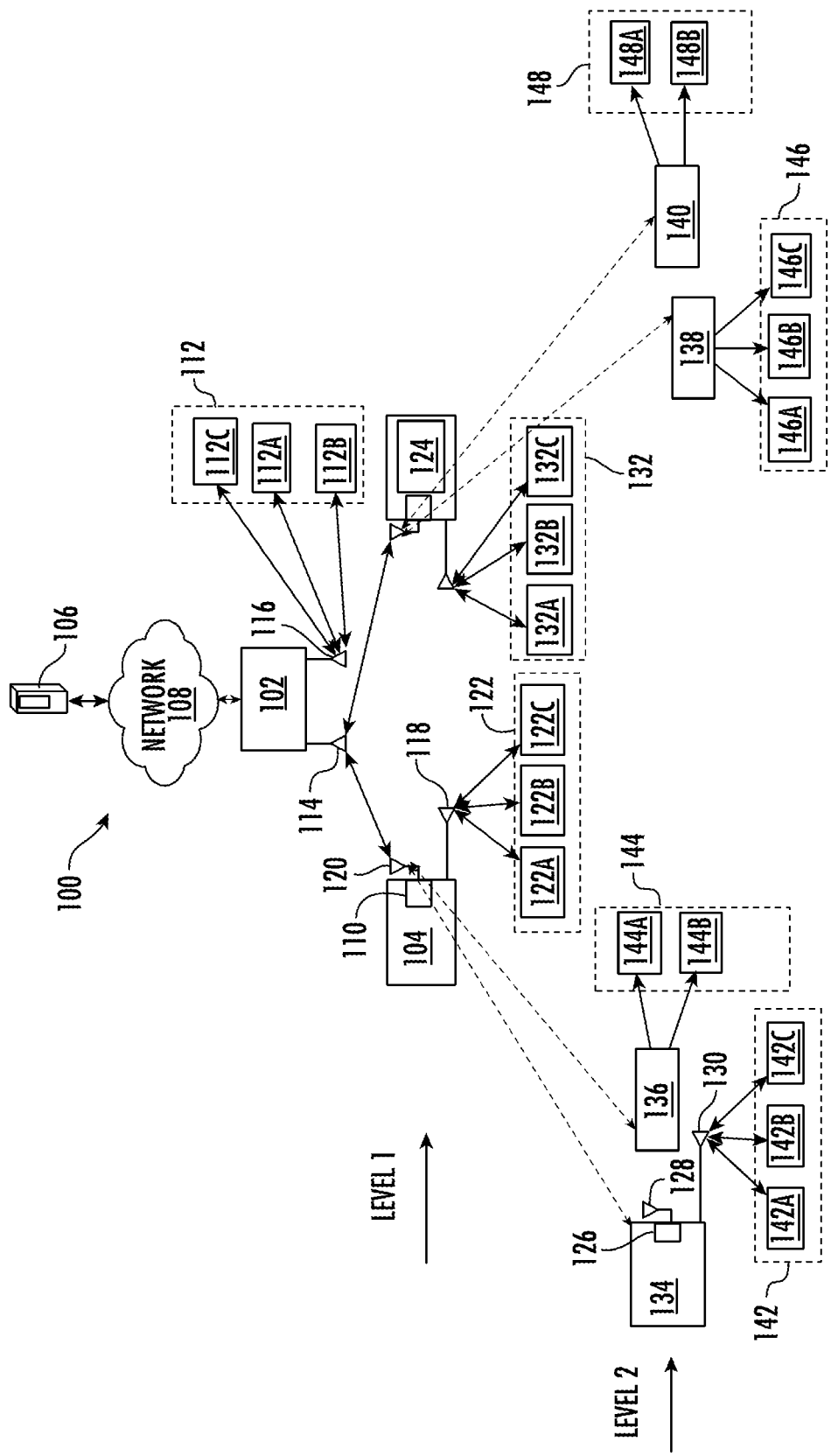
FIG. 1 illustrates a block diagram of a system environment, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "electronically coupled," "electronically coupling," "electronically couple," "in communication with," "in electronic communication with," "communicatively coupled", or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

The term "antenna element" is used herein to correspond to a device or an apparatus (for example, an active element) that may be configured to generate radio frequency (RF) signals when a voltage signal is applied at the antenna element. For example, the antenna element may be configured to generate RF signal in a high frequency (HF) band or a low frequency (LF) band. Additionally, or alternatively, the antenna element may generate the RF signal in the ultra-high frequency (UHF) band. Additionally, or alternatively, the antenna element may generate the RF signal in other frequency band(s). In some examples, the antenna element may further comprise a matching circuit that, for example, is electronically coupled to the active element to generate the RF signals.

The term "radio frequency identification (RFID) tag" is used herein to correspond to an article, a device, or an apparatus that may comprise an integrated circuit (IC), an antenna element, and/or a substrate. In an example embodiment, the antenna element and the IC may be fabricated on the substrate. In an example embodiment, the IC may be communicatively coupled to the antenna element through an interconnect on the substrate. In an example embodiment, the integrated circuit in the RFID tag may be configured to store encoded information or encoded data. In some examples, the RFID tag may be configured to operate in one or more RF frequency bands such as, but not limited to, 3 MHZ-30 MHZ (the HF band) and/or 860 MHz-960 MHZ (the UHF band). In some example embodiments, the RFID tag may have a dedicated power source that may enable the RFID tag to communicate with one or more components. Such RFID tags are referred to as active RFID tags. In alternative example embodiments, the RFID tag may not have a dedicated power source. Such RFID tags are referred to as passive RFID tags. In such embodiments, the RFID tag may have a power coupler that is capable of inducing electrical charge when the RFID tag is brought in an RF field. The induced electrical charge may thereafter be used to power the RFID tag itself.

A RFID system may include one or more RFID readers. The one or more RFID readers may be configured to read one or more RFID tags (placed on one or more assets) either continuously or periodically. Further, the one or more RFID readers may be configured to transmit data, obtained from the one or more RFID tags, to a central server periodically. To facilitate the transmission of the data to the central server, the one or more RFID readers may be communicatively coupled to the central server through a backbone network such as, but not limited to, a wireless network, an Ethernet network, and/or the like.

The UHF RFID technology is typically used as a cost effective and secure option for asset tracking in different environments, such as, hospitals, hotels, warehouses, etc., as compared to other conventional asset tracking technologies using, for example, Bluetooth, Wi-Fi, etc. A conventional RFID reader with a 30 dbm output RF power can read an RFID tag within a range of about 7 meters to 10 meters distance. Such RFID readers are connected to a backend server via power over ethernet (POE)/Wi-fi connectivity. Typically, commercial RFID readers are equipped with 1-4 RF ports which can be used to connect external antennas using an RF Cable. Hence, multiple RFID readers are required to cover geographically distributed critical zones of an environment such as a hospital. However, since RF cables are usually costly and their losses increase/meter, the effective radiated power becomes, thereby attributing to low tag read distances. Further, the solution deployment cost also increases considering high cost of UHF RFID readers, antenna, RF cables, etc.

Systems and methods described herein disclose an RFID system that may include one or more RFID readers. In an embodiment, the one or more RFID readers may be configured to transmit data, obtained from one or more RFID tags (placed on one or more assets), to the central server via a master RFID reader communicatively coupled to the central server via a network. In an embodiment, the master RFID reader and the one or more RFID readers (slave RFID readers) are configured in a mesh topology to allow transmission of the data to the central server. In an embodiment, the RFID system may comprise an RFID reader at one level of the mesh topology that is coupled to a first RFID reader and a second RFID reader at a preceding level and a subsequent level of the mesh topology, respectively. The systems and methods described herein allow the conventional RFID system to be re-architected in the mesh topology such that, the connection of one RFID reader to another RFID reader makes the RFID system more expandable in the form of a mesh as well as economically cheap to deploy. As part of this architecture, a master RFID reader may communicate to many mesh RFID readers (slave readers) using the same RFID Tag protocol like EPC Gen2 Air interface protocol in the mesh topology.

In some examples, the first RFID reader may correspond to a master RFID reader that may comprise a communication module. In some examples, the communication module in the first RFID reader may be battery powered and may be capable of communicating with the central server. The communication module may utilize one or more communication protocols, such as, but not limited to, a Wireless Area Network (WAN), a Local Area Network (LAN), and/or a Metropolitan Area Network (MAN), for example, ethernet, 2G, 3G, 4G, 5G, Wireless Fidelity (Wi-Fi) network, WiMAX, ZigBee, Bluetooth, and/or the like to communicate with the central server. In some other examples, the first RFID reader may correspond to a slave RFID reader that may comprise a first RFID tag and an RFID reader unit. In an embodiment, the first RFID tag may comprise a first antenna element and the RFID reader unit may comprise a second antenna element. In an embodiment, the first RFID tag of the first RFID reader may communicate with one or more RFID readers via the first antenna element and the RFID reader unit may communicate with one or more second RFID tags, for example, placed on one or more assets, via the second antenna element. In an embodiment, the RFID reader unit may be configured to store data, received from the one or more second RFID tags in a memory unit of the first RFID reader, which the first RFID tag of the first RFID reader may communicate with the one or more RFID readers of the mesh topology via the first antenna element of the first RFID reader.

In some examples, the second RFID reader may correspond to a slave RFID reader that may comprise a first RFID tag and an RFID reader unit. In an embodiment, the first RFID tag may comprise a first antenna element and the RFID reader unit may comprise a second antenna element. In an embodiment, the first RFID tag of the second RFID reader may communicate with one or more RFID readers of the mesh topology via the first antenna element of the first RFID tag. The second RFID reader may be configured to utilize the RFID reader unit to, periodically or continuously, interrogate one or more second RFID tags (installed on one or more assets). Further, the RFID reader unit may be configured to store data, received from the one or more second RFID tags (in response to the interrogation command) in a memory unit of the second RFID reader, which the first RFID tag of the second RFID reader may communicate with the one or more RFID readers of the mesh topology via the first antenna element of the second RFID reader.

In some examples, the first RFID reader (in the preceding level of the mesh topology with respect to the RFID reader) may be configured to, periodically or continuously, interrogate the first RFID tag in the RFID reader. In this example embodiment, the first RFID reader corresponds to the master RFID reader that is coupled to the central server via the network. Upon receiving the interrogation command, the first RFID tag may be configured to access the memory unit of the RFID reader to retrieve the data (received from the one or more second RFID tags in the vicinity of the RFID reader), and/or may be configured to transmit the data to the first RFID reader. Upon receiving the data from the RFID reader, the first RFID reader may be configured to transmit the data to the central server by utilizing the battery powered communication module of the first RFID reader.

In some examples, the data may be shared between the first RFID reader (at the preceding level of the mesh topology with respect to the RFID reader), the RFID reader, and the second RFID reader (at the subsequent level of the mesh topology with respect to the RFID reader) in accordance with one or more RFID communication protocols. As such, example systems and methods do not rely on the backbone network to communicate the data between the first RFID reader, the RFID reader, and the second RFID reader. For example, in scenarios of a power outage, the first RFID reader may continue to operate on the battery power. Further, the first RFID reader may be able to interrogate the first RFID tag in the RFID reader during power outage, as the first RFID tag may be powered either through a battery in the first RFID tag (i.e., the first RFID tag is an active RFID tag) or through the RF signals transmitted by the first RFID reader (i.e., the first RFID tag is a passive tag). Accordingly, the loss of data during such scenarios may be avoided. Further, in environments where Wi-Fi coverage is lacking, the data from the RFID tags of the RFID readers at different levels of the mesh topology are transmitted through the RFID system disclosed herein. Examples of the disclosed embodiments may reduce overall cost of implementing the RFID system (for example, by reducing the reliance on the backbone network).

FIG. 1 illustrates a block diagram of a system environment 100 according to one or more embodiments described herein. In an embodiment, the system environment 100 illustrated in FIG. 1 depicts a mesh topology of RFID readers. In an example embodiment, the system environment 100 may include a first RFID reader 102, one or more RFID readers 104, 124 (at a level subsequent to the level of the first RFID reader 102 in the mesh topology), one or more second RFID readers 134, 136, 138, 140 and (at a level subsequent to the level of the one or more RFID readers 104, 124 in the mesh topology), and a central server 106. In an embodiment, the first RFID reader 102 may be communicatively coupled to the central server 106 through a network 108. In this embodiment, the first RFID reader 102 corresponds to a master RFID reader of the mesh topology. In an embodiment, the master RFID reader may provide a tag read range of about 7 meters to 8 meters. In some other embodiments, the first RFID reader 102 may be communicatively coupled to one or more RFID readers 104, 124 in the mesh topology. In such an embodiment, the first RFID reader 102 and the one or more RFID readers 104, 124 correspond to slave RFID readers of the mesh topology. In some examples, each of the RFID readers 104, 124 and the second RFID readers may include a first RFID tag. For example, the RFID reader 104 comprises the first RFID tag 110, the second RFID reader 134 comprises the first RFID tag 126, etc. In some examples, the system environment 100 may include one or more second RFID tags (for example, 112, 122, 132, 142, 144, 146, 148, etc.). In an embodiment, the second RFID tags may be positioned on, for example but not limited to, one or more assets to be tracked by a respective RFID reader in the vicinity of the second RFID tags. In an embodiment, the second RFID tags are read by one or more RFID readers in the vicinity of the respective second RFID tags. For example, the second RFID tags 112 are read by the first RFID reader 102, the second RFID tags 122 are read by the RFID reader 104, the second RFID tags 142 are read by the second RFID reader 134, etc. In an example embodiment, the second RFID tags 122 may be similar to the first RFID tag 110. In some examples, the embodiments applicable on the first RFID tag 110 may also be applicable on the second RFID tags 122.

Figure 7:
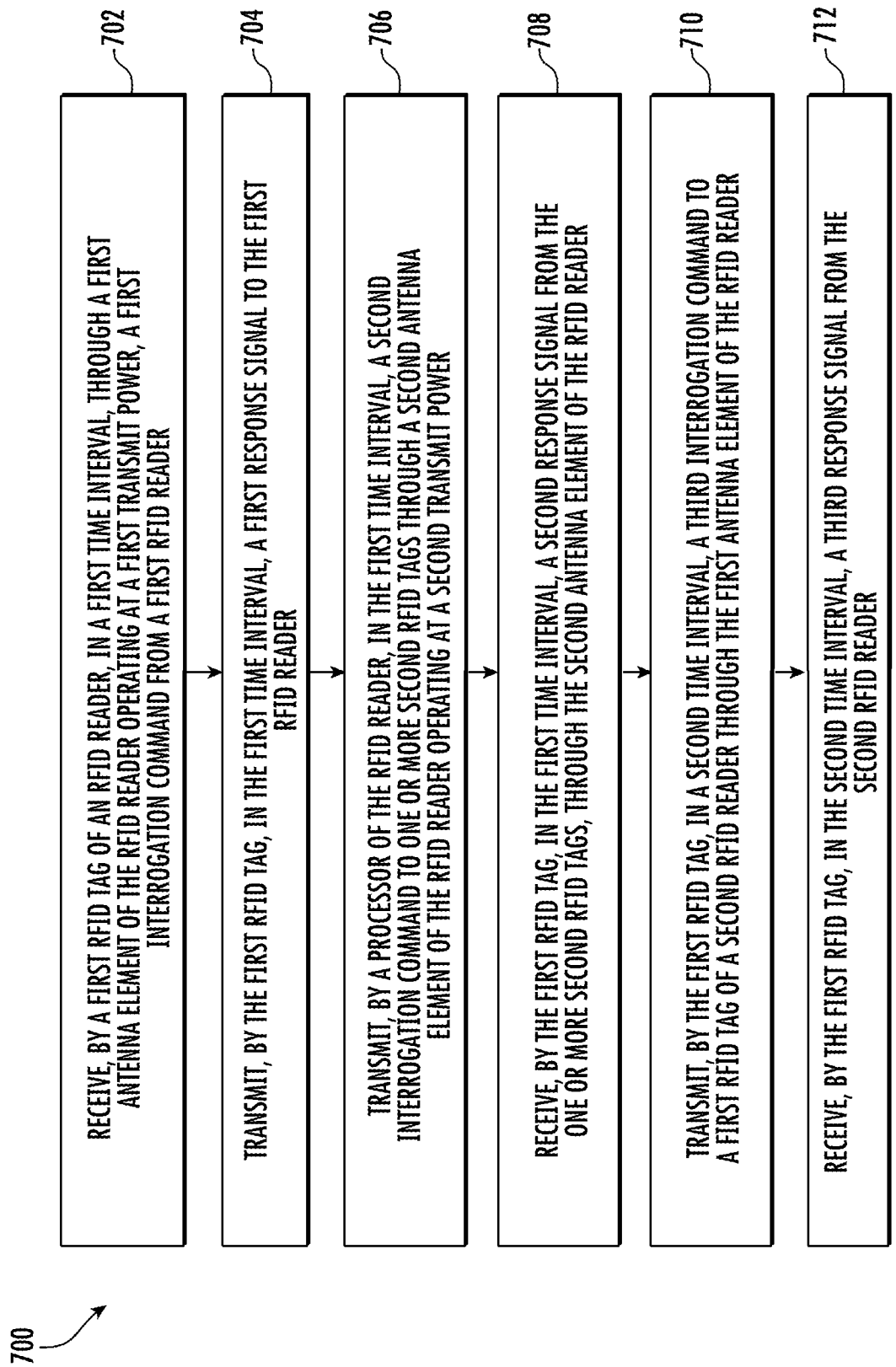
FIG. 7 illustrates a flowchart to operate an RFID reader, according to one or more embodiments described herein.

In an example embodiment, the RFID reader 104 may include suitable logic and/or circuitry that may enable the RFID reader 104 to respond to an interrogation command from the first RFID reader 102, details of which are further described in FIG. 7. For example, the first RFID reader 102 may transmit a first interrogation command to the first RFID tag 110 of the RFID reader 104 in a first time interval. The first RFID tag 110 may respond to the first interrogation command with a first response signal, in the first time interval. In another example embodiment, the RFID reader 104 may include suitable logic and/or circuitry that may enable the RFID reader 104 to interrogate the second RFID tags 122, as well as the first RFID tag 126 in the second RFID reader 134, details of which are further described in FIG. 7. For example, the RFID reader 104 may transmit a second interrogation command and a third interrogation command to the second RFID tags 122 in the vicinity of the RFID reader 104 and the first RFID tag 126 of the second RFID reader 134, respectively. In an embodiment, the RFID reader 104 transmits the second interrogation command to the second RFID tags 122 in the first time interval via a second antenna element 118 of the RFID reader 104 operating at a second transmit power, and transmits the third interrogation command to the first RFID tag 126 of the second RFID reader 134 in a second time interval via a first antenna element 120 of the first RFID tag 110 of the RFID reader 104 operating at a first transmit power. In some examples, the first RFID reader 102 may transmit the first interrogation command and the RFID reader 104 may transmit the second interrogation command and the third interrogation command over one or more frequency bands, such as but not limited to, the HF band and/or the UHF band. Additionally, or alternatively, the first RFID reader 102 and/or the RFID reader 104 may utilize one or more modulation techniques, such as but not limited to, Amplitude Shift keying (ASK) and Phase Jitter Modulation (PJM), to transmit the first interrogation command, the second interrogation command, and/or the third interrogation command on the one or more frequency bands. The RF signal, over which the first interrogation command is transmitted to the first RFID tag 110 of the RFID reader 104, is hereinafter referred to as a first signal. The RF signal, over which the second interrogation command is transmitted to the second RFID tags 122, is hereinafter referred to as a second signal. The RF signal, over which the third interrogation command is transmitted to the first RFID tag 126 of the second RFID reader 134, is hereinafter referred to as a second signal.

Figure 6:
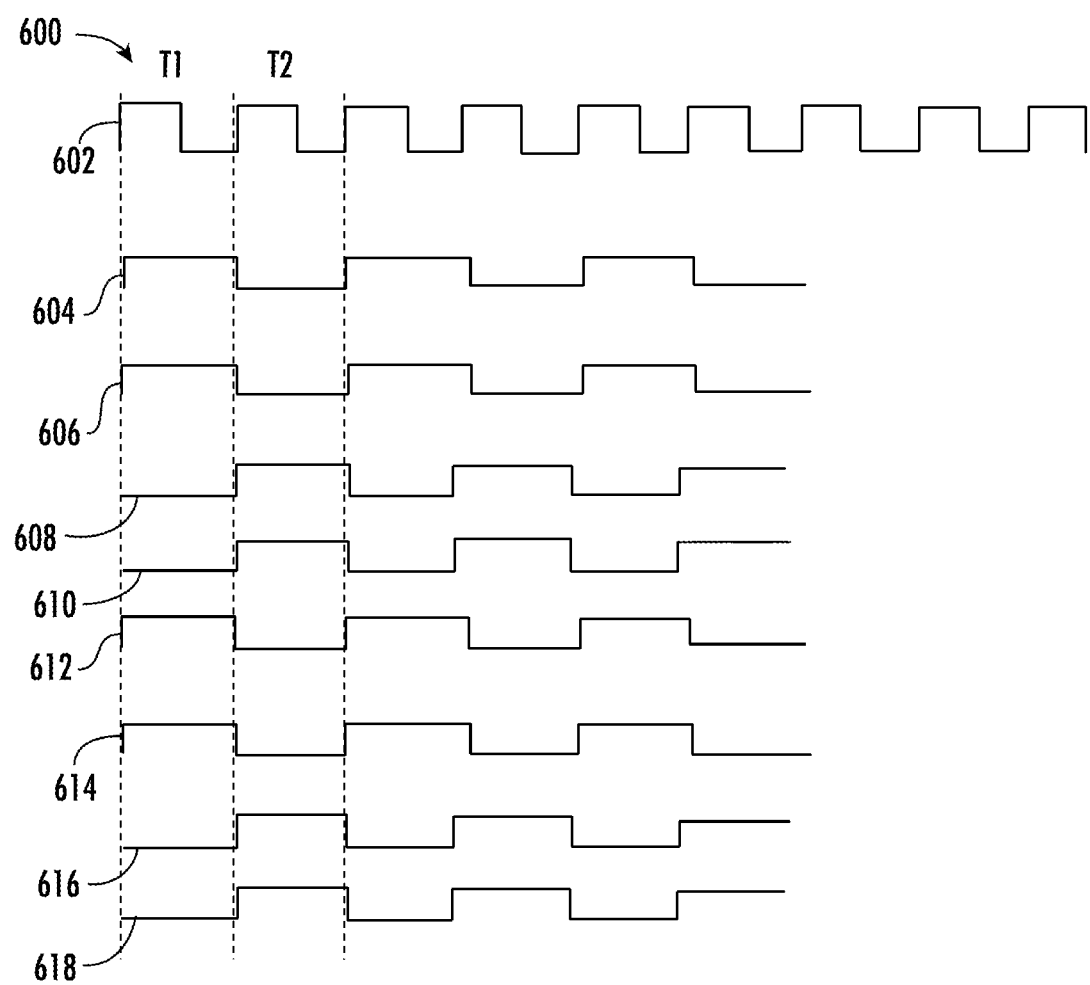
FIG. 6 illustrates an example timing diagram of transmission of interrogation commands by different RFID readers, according to one or more embodiments described herein.

In response to the first interrogation command, the first RFID reader 102 may receive a first response signal from the first RFID tag 110 of the RFID reader 104, details of which are further described in FIG. 6. In response to the second interrogation command and the third interrogation command, the RFID reader 104 may receive a second response signal and/or a third response signal from the second RFID tags 122 in the vicinity of the RFID reader 104 and the first RFID tag 126 of the second RFID reader 134, respectively, details of which are further described in FIG. 7. In an example embodiment, the first response signal, the second response signal, and the third response signal may include first data, second data, and third data, respectively. In an embodiment, the first RFID reader 102 may be further configured to transmit the first data, the second data, and/or the third data to the central server 106 over the network 108.

In an example embodiment, the first RFID reader 102 may comprise a first antenna element 114 that may be configured to facilitate transmission of the first interrogation command (through the first signal) and reception of the first data (through the first response signal) from the first RFID tag 110 of the RFID reader 104. In an example embodiment, the first antenna element 114 corresponds to an active element that may be configured to generate RF signals (e.g., the first signal) when a voltage signal is applied at the first antenna element 114. For example, the first antenna element 114 may be configured to generate the first signal in HF band and/or UHF band. Some examples of the first antenna element 114 may include, but are not limited to, an omnidirectional antenna, a holographic antenna, a multiple input multiple output MIMO antenna, and/or the like. In some examples, the first antenna element 114 may be coupled to a matching circuit (not shown) that may enable the first antenna element 114 to generate the first signal. Additionally, or alternatively, the matching circuit may include one or more phase shifters (not shown) that may allow the first antenna element 114 to generate one or more beams in one or more directions (hereinafter referred to as beamforming). Such beamforming of the first signal may allow the first RFID reader 102 to direct the first signal to a particular location where the RFID reader 104 may be positioned.

Additionally or alternatively, the first RFID reader 102 may comprise a second antenna element 116 that may be configured to facilitate transmission of a second interrogation command (over the second signal) and reception of the second data (via the second response signal) from the second RFID tags 112 in the vicinity of the first RFID reader 102. In some examples, the second antenna element 116 may be structurally similar to the first antenna element 114. In some examples, the embodiments applicable on the first antenna element 114 may also applicable on the second antenna element 116. Further, in some examples, the first antenna element 114 may be spaced apart from the second antenna element 116. In some examples, the second antenna element 116 may be configured to direct the second signal in a first predetermined direction. As such, the first RFID reader 102 may scan the second RFID tags 112 positioned or transiting through a location where the second signal is being directed by the second antenna element 116. In various examples, the first antenna element 114 and the second antenna element 116 may have various configurations. For example, the first antenna element 114 and/or the second antenna element 116 may have 5 dbi antenna gain rating and provide 35 dbm effective isotropic radiated power (EIRP).

In some examples, the scope of the disclosure is not limited to the first RFID reader 102 having two antenna elements (i.e., the first antenna element 114 and the second antenna element 116). In an example embodiment, the first RFID reader 102 may have only one antenna element that may be configured to transmit the first interrogation command and the second interrogation command. In such an embodiment, the first RFID reader 102 may be configured to separate the first interrogation command and the second interrogation command by a predetermined time period and/or polarization. For example, the first RFID reader 102 may be configured to separate the transmission of the first interrogation command and the second interrogation command by utilizing Time Division Multiple Access (TDMA) technology (which enables the separation of the transmission by the predetermined time period). In another example, the first RFID reader 102 may be configured to separate the transmission of the first interrogation command and the second interrogation command by utilizing Orthogonal Frequency Division Multiple Access (OFDMA) technology. Similarly, the receptions of signals (e.g., the first response signal and the second response signal) by such antenna may be separated by the predetermined time period and/or polarization.

Figure 2:
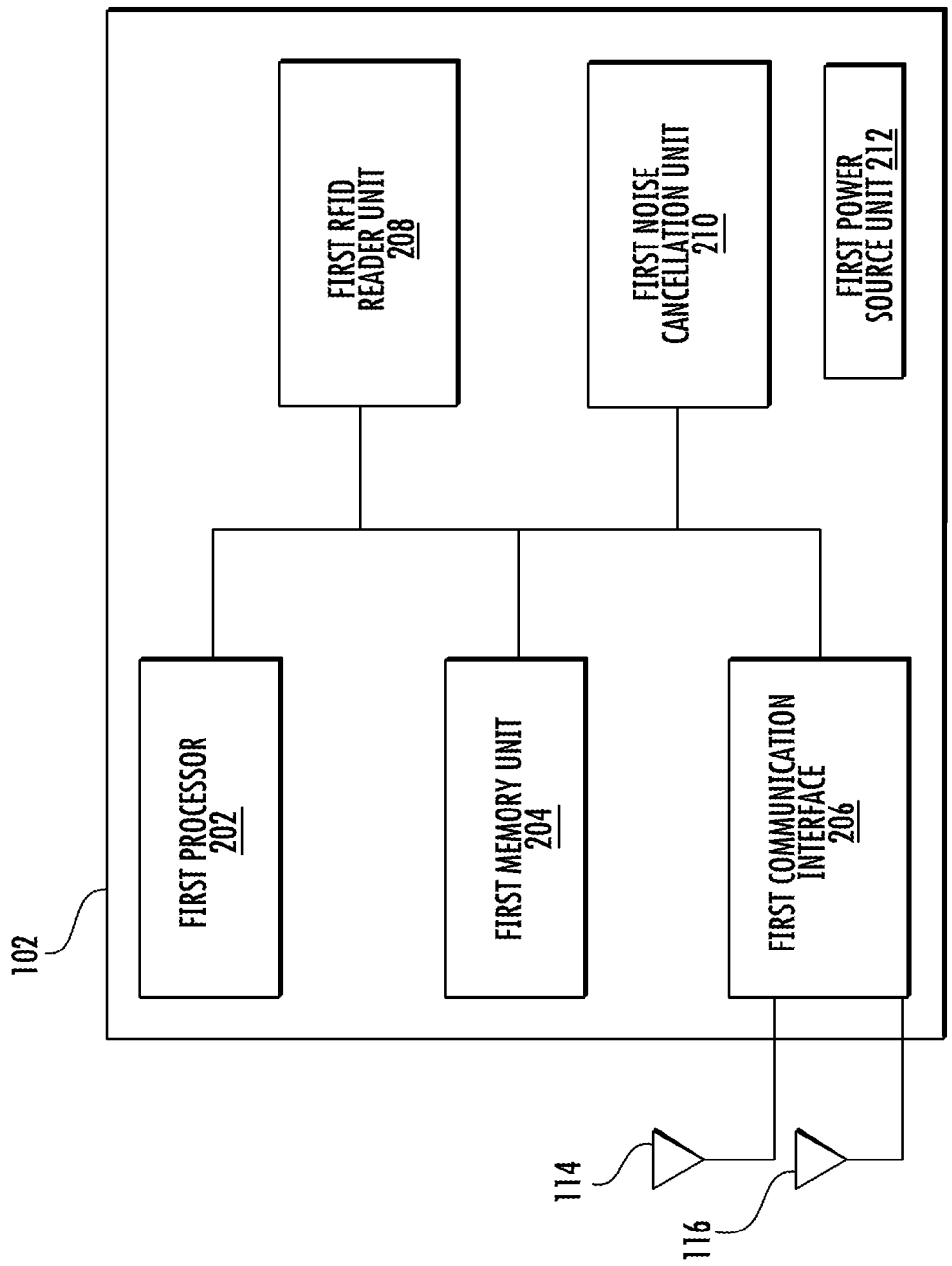
FIG. 2 illustrates a block diagram of an example master RFID reader, according to one or more embodiments described herein.

The structure and operation of the first RFID reader 102 is further described in conjunction with FIG. 2.

In an example embodiment, the RFID reader 104 may include suitable logic and/or circuitry that may enable the RFID reader 104 to interrogate the second RFID tags 122 in the vicinity of the RFID reader 104, as is further described in FIG. 7. In some examples, the structure of the RFID reader 104 may be similar to the first RFID reader 102. For example, the RFID reader 104 includes a first antenna element 120 that may be configured to generate the third signal and a second antenna element 118 that may be configured to generate the second signal. Further, the RFID reader 104 may be configured to utilize the second antenna element 118 to transmit the second interrogation command to the second RFID tags 122 in the vicinity of the RFID reader 104 over the second signal, as is further described in FIG. 7. Furthermore, the RFID reader 104 may utilize the second antenna element 118 to receive the second response signal (that includes the second data) from the second RFID tags 122, as is further described in FIG. 7. In an embodiment, the second antenna element 118 is configured to operate at a second transmit power that is below the first transmit power of the first antenna element 120 of the first RFID tag 110 of the RFID reader 104. In some examples, the second antenna element 118 of the RFID reader 104 may have a similar structure to that of the second antenna element 116 of the first RFID reader 102. In some examples, the embodiments applicable on the second antenna element 116 of the first RFID reader 102 may also be applicable on the second antenna element 118 of the RFID reader 104. In some examples, the second antenna element 118 of the RFID reader 104 may be configured to direct the second signal in a second predetermined direction. As such, the RFID reader 104 may scan the second RFID tags 122 positioned or transiting through a location where the second signal is being directed by the second antenna element 118.

Additionally, or alternatively, the RFID reader 104 may include the first RFID tag 110. In an example embodiment, the first RFID tag 110 may include a suitable logic and/or circuitry that may enable the first RFID tag 110 to receive the first interrogation command from the first RFID reader 102, as is further described in conjunction with FIG. 7. In response to the first interrogation command, the first RFID tag 110 may be configured to transmit the first data to the first RFID reader 102, as is further described in FIG. 7. In an example embodiment, the first RFID tag 110 may include an integrated circuit (IC), a first antenna element 120, and a substrate. In an example embodiment, the first antenna element 120 and the IC are fabricated on the substrate. In an example embodiment, the first antenna element 120 may have a similar structure to that of the first antenna element 114 of the first RFID reader 102. Further, the embodiments applicable on the first antenna element 114 of the first RFID reader 102 are also applicable of the first antenna element 120 of the first RFID tag 110 of the RFID reader 104. In some examples, the IC is communicatively coupled to the first antenna element 120 through an interconnect on the substrate. Additionally, or alternately, the first RFID tag 110 may be associated with a unique identifier (ID) that may be stored in the IC. In some examples, the unique ID of the first RFID tag 110 may correspond to an ID that may be utilized to differentiate the first RFID tag 110 from the other first RFID tags of other RFID readers in the system environment 100, and further to differentiate the other RFID readers from one another. For example, the unique ID for the first RFID tag 110 in the RFID reader 104 may be different from the unique ID of the first RFID tag 126 in the second RFID reader 134. Some examples of the unique ID may include a medium access control (MAC) Address, and/or the like. In some examples, the first RFID tag 110 may be configured to operate in various RF frequency bands such as, but not limited to, 3 MHZ-30 MHZ (the HF band (for example 13.56 MHZ)) and/or 860 MHz-960 MHZ (UHF band). In some example embodiments, the first RFID tag 110 may have a dedicated power source that may enable the first RFID tag 110 to communicate with one or more components of the system environment 100. In alternative example embodiments, the first RFID tag 110 may not have the dedicated power source. In such embodiments, the first RFID tag 110 may have a power coupler that is capable of inducing electrical charge when the first RFID tag 110 is brought in an RF field. The induced electrical charge is thereafter used to power the first RFID tag 110 itself. For example, the first RFID tag 110 of the RFID reader 104 may induce power when the first RFID tag 110 receives the first signal from the first RFID reader 102. The structures of the first RFID tag 110 and the RFID reader 104 are further described in conjunction with FIG. 3. In various examples, the RFID reader 104 may have various configurations. For example, the RFID reader 104 may have 30 dbm output power and provide 25 dbm EIRP.

In an example embodiment, the RFID reader 104 may include suitable logic and/or circuitry that may enable the first RFID tag 110 of the RFID reader 104 to interrogate the second RFID reader 134 via the first antenna element 120 of the first RFID tag 110, as is further described in FIG. 7. For example, the first antenna element 120 may be configured to generate the third signal comprising the third interrogation signal. In an embodiment, the third interrogation command is transmitted, in a second time interval, to the first RFID tag 126 of the second RFID reader 134 through the first antenna element 120 operating at the first transmit power. In an embodiment, the second time interval occurs subsequent to the first time interval. Further, the RFID reader 104 may utilize the first antenna element 120 to receive the third response signal (that includes the third data) from the second RFID reader 134, as is further described in FIG. 7. In some examples, the first antenna element 120 of the RFID reader 104 may have a similar structure to that of the first antenna element 114 of the first RFID reader 102. In some examples, the embodiments applicable on the first antenna element 114 of the first RFID reader 102 may also be applicable on the first antenna element 120 of the RFID reader 104. In some examples, the first antenna element 120 of the RFID reader 104 may be configured to direct the third signal in a third predetermined direction. As such, the RFID reader 104 may scan the second RFID reader 134 positioned or transiting through a location where the third signal is being directed by the first antenna element 120.

In an example embodiment, the second RFID reader 134 may include suitable logic and/or circuitry that may enable the second RFID reader 134 to interrogate the second RFID tags 142 in the vicinity of the second RFID reader 134 and one or more third RFID readers in the vicinity of the second RFID reader 134. In some examples, the structure and operation of the second RFID reader 134 may be similar to the RFID reader 104. For example, the second RFID reader 134 includes a first antenna element 128 that may be configured to generate a third signal comprising a third interrogation command directed towards a first RFID tag of a third RFID reader (not shown) in the vicinity of the second RFID reader 134, and a second antenna element 130 that may be configured to generate the second signal comprising the second interrogation command directed towards second RFID tags 142 in the vicinity of the second RFID reader 134.

In an example embodiment, the RFID readers 104, 124 and the second RFID readers 134, 136, 138, 140 may be installed in one or more zones of the system environment 100. For example, the RFID readers 104, 124 may be installed in Level-1 of the system environment 100 and the second RFID readers 134, 136, 138, 140 may be installed in the Level-2 in the of the system environment 100. In an example embodiment, the RFID reader 104 may be configured to interrogate the second RFID tags 122 in Level-1 in the system environment 100 in a first time interval and to interrogate the first RFID tag 126 of the second RFID reader 134 in Level-2 in the system environment 100 in a second time interval, where the second time interval occurs subsequent to the first time interval. Similarly, the second RFID reader 134 may be configured to interrogate the second RFID tags 142 in Level-2 in the system environment 100. The second RFID reader 134 may be configured to interrogate the second RFID tags 142 in Level-2 in the system environment 100 in the first time interval and to interrogate the first RFID tag of the third RFID reader in Level-3 (not shown) in the system environment 100 in the second time interval.

In an example embodiment, the central server 106 may include suitable logic and/or circuitry that may enable the central server 106 to receive the first data, the second data, and/or the third data from the first RFID reader 102 via, for example but not limited to, the network 108. In some examples, the central server 106 may utilize the first data, the second data, and/or the third data to track the one or more assets in the system environment 100. Additionally, or alternatively, the central server 106 may utilize the first data, the second data, and/or the third data to monitor the availability of the one or more assets in the system environment 100. In an example embodiment, the central server 106 may correspond to a computing device such as, but not limited to, a laptop, a server, or portable computing device.

The network 108 corresponds to a medium through which content and messages may flow between various devices in the system environment 100 (e.g., the first RFID reader 102 and central server 106). Examples of the network 108 may include wired and/or wireless networks, such as but not limited to, a Wireless Fidelity (Wi-Fi) network, a Wireless Area Network (WAN), a Local Area Network (LAN), and/or a Metropolitan Area Network (MAN). Various devices in the system environment 100 can connect to the network 108 in accordance with various wired and wireless communication protocols such as Transmission Control Protocol and Internet Protocol (TCP/IP), User Datagram Protocol (UDP), and 2G, 3G, 4G, or 5G communication protocols.

FIG. 2 illustrates a block diagram of the first RFID reader 102, according to one or more embodiments described herein. In an example embodiment, the first RFID reader 102 may comprise a first processor 202, a first memory unit 204, a first communication interface 206, a first RFID reader unit 208, the first antenna element 114, the second antenna element 116, a first noise cancellation unit 210, and a first power source unit 212.

The first processor 202 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 2 as a single processor, in an embodiment, the first processor 202 may include a plurality of processors and signal processing modules. The plurality of processors may be embodied on a single electronic device or may be distributed across a plurality of electronic devices collectively configured to function as the circuitry of the first RFID reader 102. The plurality of processors may be in operative communication with each other and may be collectively configured to perform one or more functionalities of the circuitry of the first RFID reader 102 as described herein. In an example embodiment, the first processor 202 may be configured to execute instructions stored in the first memory unit 204 or otherwise accessible to the first processor 202. These instructions, when executed by the first processor 202, may cause the circuitry of the first RFID reader 102 to perform one or more of the functionalities, as described herein.

Whether configured by hardware, firmware/software methods, or by a combination thereof, the first processor 202 may include an entity capable of performing operations according to embodiments of the present disclosure while configured accordingly. Thus, for example, when the first processor 202 is embodied as an ASIC, FPGA, or the like, the first processor 202 may include specifically configured hardware for conducting one or more operations described herein. Additionally, or alternatively, when the first processor 202 is embodied as an executor of instructions, such as may be stored in the first memory unit 204, the instructions may specifically configure the first processor 202 to perform one or more algorithms and operations described herein.

Thus, the first processor 202 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first memory unit 204 may include suitable logic, circuitry, and/or interfaces that are adapted to store a set of instructions that is executable by the first processor 202 to perform predetermined operations. Additionally, or alternately, the first memory unit 204 may be configured to store the first data (obtained from the first RFID tag 110 of the RFID reader 104) and the second data (obtained from the second RFID tags 112). Further, the first memory unit 204 may be configured to store a list of the RFID readers 104, 124 and/or the second RFID readers 134, 136, 138, 140 along with the respective unique ID. Additionally or alternatively, the first memory unit 204 may be configured to store zone ID associated with the RFID readers 104, 124 and the second RFID readers 134, 136, 138, 140. In an example embodiment, zone ID may be representative of zone in which the RFID reader (e.g. 104, 124, etc.) and/or the second RFID reader (e.g., 134, 136, 138, 140, etc.) is installed. In some examples, the unique ID may be associated with the respective first RFID tag in the RFID readers 104, 124 or the second RFID readers 134, 136, 138, 140. Example memory implementations may include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the first memory unit 204 may be integrated with the first processor 202 on a single chip, without departing from the scope of the disclosure.

The first communication interface 206 may include suitable logic and/or circuitry that may enable the first communication interface 206 to facilitate transmission and reception of messages and data to and from various devices. For example, the first communication interface 206 may be communicatively coupled with the central server 106. Examples of the first communication interface 206 may include, but are not limited to, an antenna, an Ethernet port, a USB port, a serial port, or any other port that can be adapted to receive and transmit data. The first communication interface 206 may transmit and receive data and/or messages in accordance with the various communication protocols, such as, but not limited to, EPC global, DOD, I2C, TCP/IP, UDP, and 2G, 3G, 4G or 5G communication protocols.

In some examples, the first communication interface 206 may facilitate the communication with the first RFID tag 110 of the RFID reader 104 and the second RFID tags 112 in the vicinity of the first RFID reader 102. In some examples, the first communication interface 206 may be communicatively coupled with the first antenna element 114 and the second antenna element 116. The first antenna element 114 may be positioned to be spatially apart from the second antenna element 116. Such positioning of the first antenna element 114 and the second antenna element 116 (spatially apart from each other) may reduce the interference between the signals transmitted/received via the first antenna element 114 and the second antenna element 116. For example, the first antenna element 114 and the second antenna element 116 spatially provide 40 dB isolation. In some examples, the first communication interface 206 may be configured to transmit/receive data through the first antenna element 114 and the second antenna element 116 by utilizing one or more of EPC global communication standards or DOD communication standards.

The first RFID reader unit 208 may include suitable logic and/or circuitry for reading the first data and the second data from the first RFID tag 110 of the RFID reader 104 and the second RFID tags 112 in the vicinity of the first RFID reader 102, respectively. To read the first data and the second data from the first RFID tag 110 of the RFID reader 104 and the second RFID tags 112, the first RFID reader unit 208 may cause the first antenna element 114 and the second antenna element 116 to transmit the first interrogation command and the second interrogation command, respectively. Further, prior to transmitting the first interrogation command the second interrogation command, the first RFID reader unit 208 may cause the first communication interface 206 to modulate the first interrogation command and the second interrogation command, over the first signal and the second signal, using the one or more modulation techniques (such as ASK and PJM). In response to the first interrogation command and the second interrogation command, the first RFID reader unit 208 may receive the first data and the second data from the first RFID tag 110 of the RFID reader 104 and the second RFID tags 112 in the vicinity of the first RFID reader 102.

In some examples, the first RFID reader unit 208 may include one or more of filters, analog to digital (A/D) converters, Digital to Analog (D/A) convertors, matching circuits, amplifiers, and/or tuners that may enable the first RFID reader unit 208 to transmit data (e.g., the first interrogation command and the second interrogation command) and receive data (e.g., the first data and the second data) over the one or more frequency bands through the first antenna element 114 and the second antenna element 116. The first RFID reader unit 208 may be implemented using one or more of Application Specific Integrated Circuit (ASIC) and Field Programmable Gate Array (FPGA).

The first noise cancellation unit 210 may include suitable logic and/or circuitry that may reduce the interference amongst the signals (e.g., the first signal, the second signal, the first response signal, and the second response signal) transmitted/received by the first antenna element 114 and the second antenna element 116. In some examples, the first noise cancellation unit 210 may include one or more filters, one or more phase shifters and/or the like. The structure and operation of the first noise cancellation unit 210 is further described in conjunction with FIG. 4. The operation of the first RFID reader 102 is further described in conjunction with FIG. 9.

In an embodiment, the first power source unit 212 may include suitable logic and/or circuitry that may provide power to the first RFID reader 102.

Figure 3:
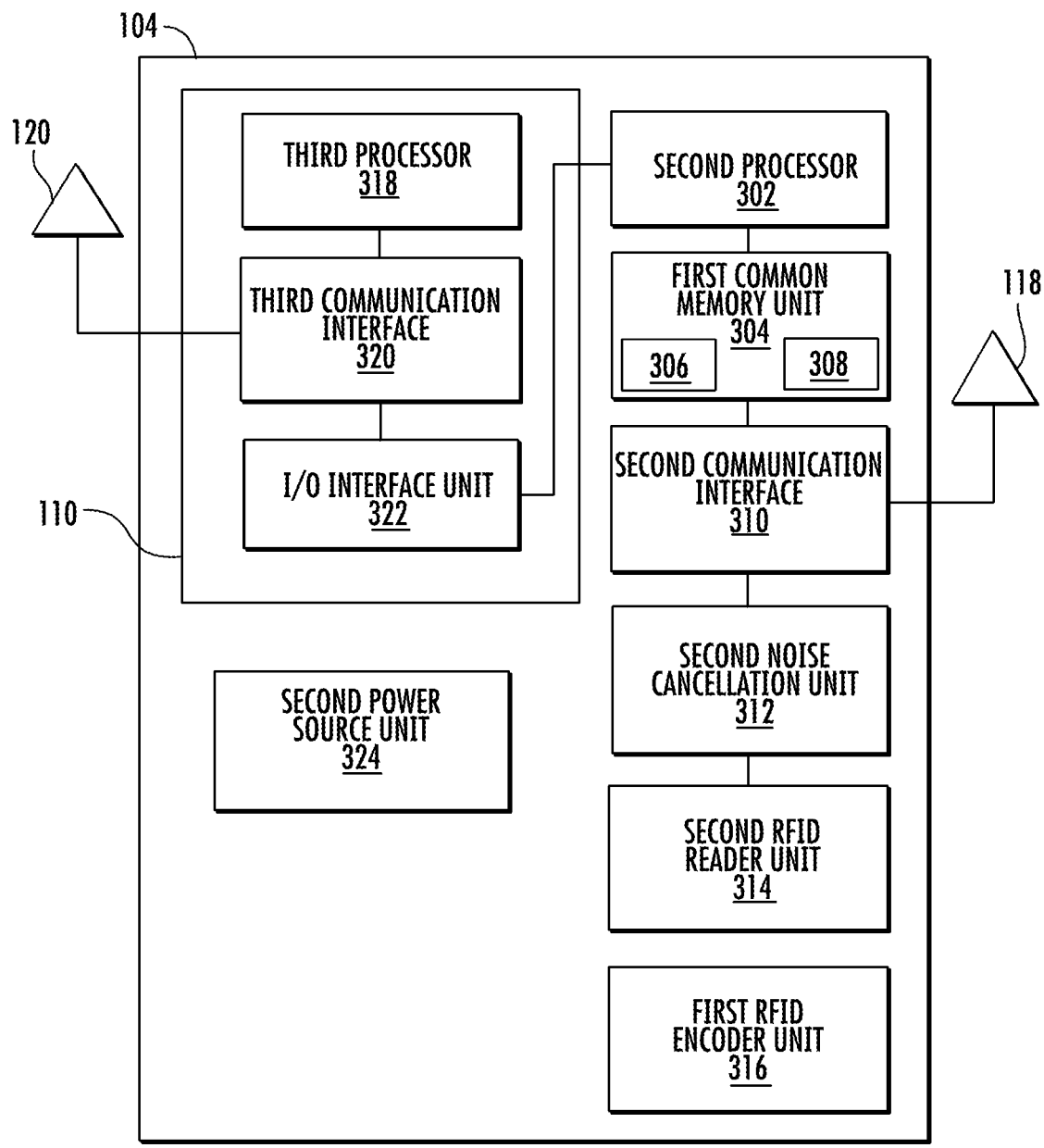
FIG. 3 illustrates a block diagram of an example slave RFID reader, according to one or more embodiments described herein.

FIG. 3 illustrates a block diagram of an example RFID reader 104, according to one or more embodiments described herein. The RFID reader 104 may include the first RFID tag 110, the second processor 302, a first common memory unit 304, a second communication interface 310, a second noise cancellation unit 312, a second RFID reader unit 314, a first RFID encoder unit 316, and a second power source unit 324. In some examples, the second communication interface 310 may further be coupled to the first antenna element 120. In an example embodiment, the first RFID tag 110 may further include a third processor 318, a third communication interface 320, and an Input/Output (I/O) interface unit 322. The third communication interface 320 may be further coupled to the second antenna element 118.

The second processor 302 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 3 as a single processor, in an embodiment, the second processor 302 may include a plurality of processors and signal processing modules. The plurality of processors may be embodied on a single electronic device or may be distributed across a plurality of electronic devices collectively configured to function as the circuitry of the RFID reader 104. The plurality of processors may be in operative communication with each other and may be collectively configured to perform one or more functionalities of the circuitry of the RFID reader 104, as described herein. In an example embodiment, the second processor 302 may be configured to execute instructions stored in the first common memory unit 304 or otherwise accessible to the second processor 302. These instructions, when executed by the second processor 302, may cause the circuitry of the RFID reader 104 to perform one or more of the functionalities, as described herein.

Whether configured by hardware, firmware/software methods, or by a combination thereof, the second processor 302 may include an entity capable of performing operations according to embodiments of the present disclosure while configured accordingly. Thus, for example, when the second processor 302 is embodied as an ASIC, FPGA, or the like, the second processor 302 may include specifically configured hardware for conducting one or more operations described herein. Alternatively, as another example, when the second processor 302 is embodied as an executor of instructions, such as may be stored in the first common memory unit 304, the instructions may specifically configure the second processor 302 to perform one or more algorithms and operations described herein.

Thus, the second processor 302 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first common memory unit 304 may include suitable logic, circuitry, and/or interfaces that are adapted to store a set of instructions that is executable by the second processor 302 to perform predetermined operations. Additionally, or alternately, the first common memory unit 304 may be configured to store the second data (received from the second RFID tags 122). In some examples, a collection of the second data is referred to as the first data. Additionally, or alternately, the first common memory unit 304 may be configured to store the unique ID associated with the first RFID tag 110. Example memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the first common memory unit 304 may be integrated with the second processor 302 on a single chip, without departing from the scope of the disclosure.

Additionally, or alternatively, the first common memory unit 304 may have a first partition 306 and a second partition 308. The first partition 306 may include the one or more computer executable instructions that the second processor 302 may execute to perform the predetermined operation (e.g., operating the RFID reader 104). The second partition 308 may correspond to a partition that stores the first data in accordance with the EPC global standards. In an example embodiment, as discussed, the first data is collection of the second data, accordingly, the second partition 308 may store the second data. In an example embodiment, the second partition 308 may be accessible to both the second processor 302 and the first RFID tag 110. In some examples, the scope of the disclosure is not limited to the second partition 308 storing the first data per the EPC global standards. In an example embodiment, the first data may be stored in accordance with other partition table standards.

The second communication interface 310 may correspond to a communication interface that may facilitate transmission and reception of messages and data to and from various devices. For example, through the second communication interface 310, the RFID reader 104 may be configured to communicate with the second RFID tags 122. Examples of the second communication interface 310 may include, but are not limited to, an antenna, an Ethernet port, a USB port, a serial port, or any other port that can be adapted to receive and transmit data. The second communication interface 310 may transmit and receive data and/or messages in accordance with the various communication protocols, such as but not limited to, EPC global, and DOD communication protocols.

Additionally, or alternatively, the second communication interface 310 is communicatively coupled with the first antenna element 120. In some examples, the second communication interface 310 may be configured to transmit/ receive data through the first antenna element 120 by utilizing one or more EPC global or DOD communication standards.

Figure 4:
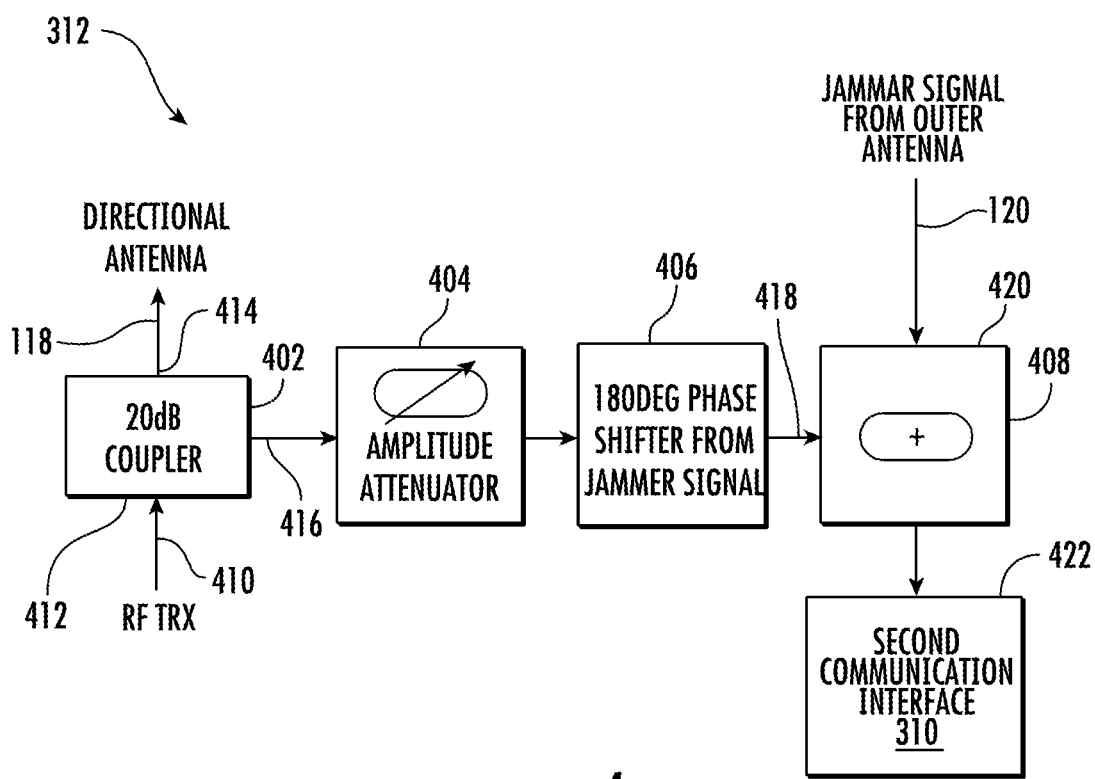
FIG. 4 illustrates a block diagram of a noise cancellation unit, according to one or more embodiments described herein.

The second noise cancellation unit 312 may be similar to the first noise cancellation unit 210. For example, the second noise cancellation unit 312 may include suitable logic and/or circuitry that may reduce the interference amongst the signals (e.g., the first signal, the second signal, the first response signal, the second response signal) received/transmitted through the first antenna element 120 and the second antenna element 118. Further, structural details of the second noise cancellation unit 312 described in conjunction with FIG. 4 are also applicable on the first noise cancellation unit 210. Additionally, or alternatively, the embodiments applicable on the second noise cancellation unit 312 are also applicable on the first noise cancellation unit 210.

The second RFID reader unit 314 may be similar to the first RFID reader unit 208 structurally and functionally. For example, the second RFID reader unit 314 may include suitable logic and circuitry for reading the second data from the second RFID tags 122, as is further described in FIG. 7. To read the second data from the second RFID tags 122, the second RFID reader unit 314 may cause the first antenna element 120 to transmit the second interrogation command to the second RFID tags 122, as is further described in FIG. 7. Further, the second RFID reader unit 314 may also cause the second communication interface 310 to modulate the second interrogation command using the one or more modulation techniques (such as ASK and PJM) prior to transmitting the second interrogation command on the one or more frequency bands. In response to the second interrogation command, the second RFID reader unit 314 may receive the second data from the second RFID tags 122, as is further described in FIG. 7.

The first RFID encoder unit 316 may include suitable logic, and/or circuitry for encoding data in the second partition 308 of the first common memory unit 304. In some example embodiments, the first RFID encoder unit 316 encodes the data in the second partition 308 of the first common memory unit 304, according to one or more of Electronic Product Code (EPC) or Department of Defense (DOD) formats. For example, the first RFID encoder unit 316 may be configured to encode the second data (received from the second RFID tags 122) in the second partition 308 of the first common memory unit 304. In some examples, the scope of the disclosure is not limited to the first RFID encoder unit 316 encoding the second data in the first common memory unit 304. In an example embodiment, the first RFID encoder unit 316 may only store the second data in the first common memory unit 304 per one or more partition standards such as NTFS and/or FAT that are not encoded.

The third processor 318 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 3 as a single processor, in an embodiment, the third processor 318 may include a plurality of processors and signal processing modules. The plurality of processors may be embodied on a single electronic device or may be distributed across a plurality of electronic devices collectively configured to function as the circuitry of the first RFID tag 110. The plurality of processors may be in operative communication with each other and may be collectively configured to perform one or more functionalities of the circuitry of the first RFID tag 110, as described herein.

Whether configured by hardware, firmware/software methods, or by a combination thereof, the third processor 318 may include an entity capable of performing operations according to embodiments of the present disclosure while configured accordingly. Thus, for example, when the third processor 318 is embodied as an ASIC, FPGA, or the like, the third processor 318 may include specifically configured hardware for conducting one or more operations described herein. Alternatively, as another example, when the third processor 318 is embodied as an executor of instructions, such as may be stored in the first common memory unit 304, the instructions may specifically configure the third processor 318 to perform one or more algorithms and operations described herein.

Thus, the third processor 318 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The third communication interface 320 may facilitate transmission and reception of messages and data to and from various devices. For example, through the third communication interface 320, the first RFID tag 110 may be configured to communicate with the first RFID reader 102 and/or the second RFID reader 134. The third communication interface 320 transmits and receives data and/or messages in accordance with the various communication protocols, such as, EPC global, and DOD communication protocols.

Additionally, or alternatively, the third communication interface 320 is communicatively coupled with the second antenna element 118. In some examples, the third communication interface 320 may be configured to transmit/receive data through the second antenna element 118 by utilizing one or more EPC global or DOD communication protocols.

The I/O interface unit 322 may include suitable logic and/or circuitry that may be configured to enable communication between the first RFID tag 110 and the first common memory unit 304, in accordance with one or more device communication protocols such as, but not limited to, I2C communication protocol, Serial Peripheral Interface (SPI) communication protocol, Serial communication protocol, Control Area Network (CAN) communication protocol, and 1-Wire® communication protocol. In some examples, the I/O interface unit 322 may be configured to retrieve the first data or the portion of the first data from the first common memory unit 304 by utilizing the one or more device communication protocol. Further, the I/O interface unit 322 may be configured to transform the retrieved first data, in accordance with the EPC global, DOD standards. Some examples of the I/O interface unit 322 may include, but not limited to, a Data Acquisition (DAQ) card, an electrical drives driver circuit, and/or the like.

In an embodiment, the second power source unit 324 may include suitable logic and/or circuitry that may provide power to the RFID reader 104 and/or the first RFID tag 110.

The structure of the second RFID reader 134 and/or other RFID readers 124, 136, 138, 140 in the mesh topology of the system environment 100 may be similar to the structure of the RFID reader 104 described herein. For example, the structure of the second RFID reader 134 may be similar to structure of the RFID reader 104.

FIG. 4 illustrates a block diagram of the second noise cancellation unit 312, according to one or more embodiments described herein.

The second noise cancellation unit 312 includes a coupler 402, an amplitude attenuator 404, a phase shifter 406, and a combiner 408. In an example embodiment, the coupler 402 may be communicatively coupled to an input channel 410 and the second antenna element 118. The coupler 402 may be communicatively coupled to the amplitude attenuator 404. The amplitude attenuator 404 may be further coupled to the phase shifter 406, and the phase shifter 406 may be further coupled to the combiner 408. The combiner 408 may be communicatively coupled to the first antenna element 120 and the second communication interface 310.

The coupler 402 may include suitable logic and/or circuitry that may enable the coupler 402 to retrieve a portion of the second signal (that may include the second interrogation command) to be transmitted via the second antenna element 118. In an example embodiment, the coupler 402 may correspond to a three terminal microwave device that may include a first terminal 412, a second terminal 414, and a third terminal 416. In some examples, the first terminal 412 may be coupled to the input channel 410, the second terminal 414 may be coupled to the second antenna element 118, and the third terminal 416 may be coupled to the amplitude attenuator 404. In an example embodiment, the input channel 410 may correspond to a signal path that may couple the second communication interface 310 with the coupler 402. The input channel 410 may correspond to a conduit/waveguide through which the second communication interface 310 may transmit the third signal to the coupler 402. In an example embodiment, the coupler 402 may be configured to transmit the portion of the second signal to the amplitude attenuator 404 through the third terminal 416. Some examples of the coupler 402 may include, but not limited to, a forward-wave coupler, a backward-wave coupler, a hybrid coupler, and/or the like.

The amplitude attenuator 404 may include suitable logic and/or circuitry to attenuate the amplitude of the portion of the second signal received from the coupler 402 to generate an attenuated portion of the second signal. In some examples, the amplitude attenuator 404 may include one or more resistors arranged in one or more configurations, such as pi-pad configuration and T-pad configuration. The one or more resistors may facilitate the attenuation of the portion of the second signal. Some examples of the amplitude attenuator 404 may include, but are not limited to, an active attenuator, a passive attenuator, π-type unbalanced attenuator circuit, T-type balanced attenuator circuit, T-type unbalanced attenuator circuit, and/or T-type balanced attenuator circuit.

The phase shifter 406 may include suitable logic and/or circuitry to shift phase of the attenuated portion of the second signal by a predetermined amount to generate a phase shifted portion of the second signal. For example, the phase shifter 406 may shift the phase of the attenuated portion of the second signal by, for example but not limited to, 180 degrees. In some examples, the phase shifter 406 may be configured to add a propagation delay to the attenuated portion of the second signal in order to shift the phase of the attenuated portion of the second signal. Some examples of the phase shifter 406 may include, but not limited to, micro-electromechanical system (MEMS) phase shifter, an analog phase shifter, a digital phase shifter, an active phase shifter, a passive phase shifter, and/or the like.

The combiner 408 may include suitable logic and/or circuitry that may enable the combiner 408 to combine one or more signals. In an example embodiment, the combiner 408 may be a three terminal microwave device that may include a fourth terminal 418, a fifth terminal 420, and a sixth terminal 422. The fourth terminal 418 may be communicatively coupled to the phase shifter 406 and may be configured to receive the phase shifted portion of the second signal. Further, the fifth terminal 420 may be coupled to the first antenna element 120, and the sixth terminal 422 may be coupled to the second communication interface 310. The combiner 408 may be configured to combine the phase shifted portion of the second signal and the third response signal received from the first antenna element 120 to generate a noise free third response signal.

In operation, the coupler 402 may be configured to retrieve the portion of the second signal from the second signal (that includes the second interrogation command) to be transmitted via the second antenna element 118. The coupler 402 may be configured to transmit the portion of the second signal to the amplitude attenuator 404. The amplitude attenuator 404 may be configured to attenuate the amplitude of the portion of the second signal to generate the attenuated portion of the second signal. In an example embodiment, the amplitude attenuator 404 may be configured to transmit the attenuated portion of the second signal to the phase shifter 406.

In some examples, the phase shifter 406 may be configured to shift the phase of the attenuated portion of the second signal by the predetermined amount. For example, the phase shifter 406 may be configured to phase shift the attenuated portion of the second signal by 180 degrees to generate phase shifted portion of the second signal. Thereafter, phase shifter 406 may be configured to transmit the phase shifted portion of the second signal to the combiner 408. In an example embodiment, the combiner 408 may be configured to combine the phase shifted portion of the second signal with the third response signal (received from the first RFID tag 126 of the second RFID reader 134).

In some examples, the third response signal received by the first antenna element 120 may comprise noise because of the interference caused by the transmission of the second signal from the second antenna element 118. For example, the third response signal may include the portion of the second signal (as noise). As discussed above, the phase shifted portion of the second signal may be 180 degrees out of phase, and the third response signal (received via the first antenna element 120) includes the portion of the second signal. Therefore, when the combiner 408 adds the third response signal with the phase shifted portion of the second signal, the phase shifted portion of the second signal may cancel out with the portion of the second signal present in the third response signal. Accordingly, the combiner 408 may generate the noise free third response signal.

In some examples, the scope of the disclosure is not limited to having one second noise cancellation unit 312 in the RFID reader 104. In an example embodiment, the RFID reader 104 may include multiple noise cancellation units.

For instance, the RFID reader 104 may include another noise cancellation unit for the second antenna element 118. The other noise cancellation unit may be configured to generate a noise free second response signal (received from the second RFID tags 122) based on the portion of the third signal (containing the third interrogation command) retrieved from the third signal transmitted via the first antenna element 120.

Figure 5:
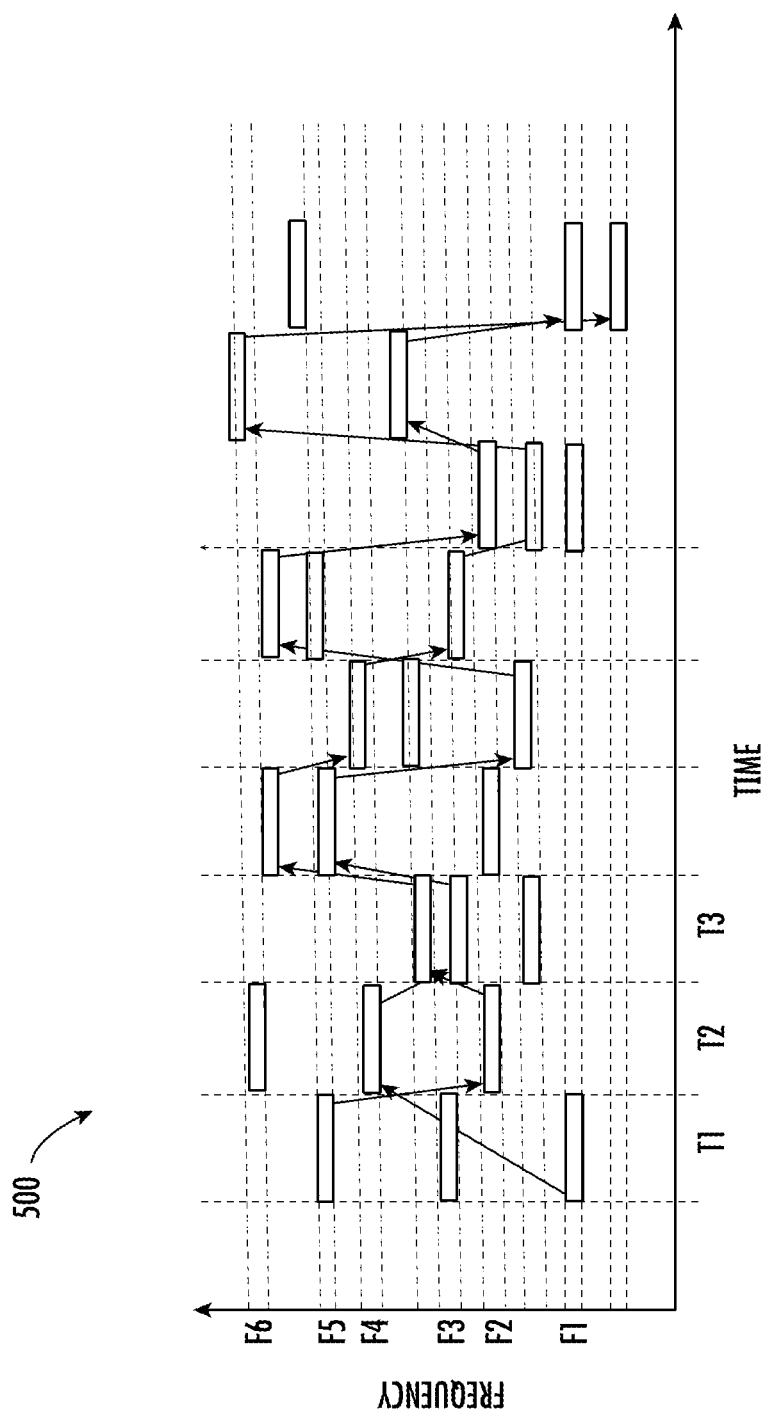
FIG. 5 illustrates an example timing diagram of operation of different RFID readers in a dense reader mode (DRM), according to one or more embodiments described herein.

FIG. 5 illustrates an example timing diagram 500 of operation of different RFID readers in a dense reader mode (DRM), according to one or more embodiments described herein. The timing diagram illustrated in FIG. 5 depicts the operation of 3 RFID readers, for example, the first RFID reader 102, the RFID reader 104, and the second RFID reader 134, in the DRM mode. The DRM mode allows for the operation of the first RFID reader 102, the RFID reader 104, and/or the second RFID reader 134 located in close proximity of each other without causing interrogator interference by the interrogation commands transmitted by the respective RFID readers. In the DRM mode, the first RFID reader 102, the RFID reader 104, and/or the second RFID reader 134 are allocated different frequency channels to communicate with the respective first RFID tags and/or the respective one or more second RFID tags, such that no two RFID readers are transmitting the respective interrogation commands on the same frequency channel, thereby reducing interference caused within different zones of the mesh topology of the system environment 100.

In an embodiment, the RFID readers implement frequency hopping in the DRM mode. For example, as illustrated in FIG. 5, the first RFID reader 102 hops from the first frequency channel F1 in the first time interval T1 to the fourth frequency channel F4 in the second time interval T2. Similarly, the RFID reader 104 hops from the third frequency channel F3 in the first time interval T1 to the sixth frequency channel F6 in the second time interval T2. Further, the second RFID reader 134 hops from the fifth frequency channel F5 in the first time interval T1 to the second frequency channel F2 in the second time interval T2. Therefore, at a given time interval, all RFID readers are transmitting respective interrogation commands in different frequency channels, thereby reducing interrogator interference that may be caused by two or more RFID readers functioning in close proximity with each other in the mesh topology of the system environment 100 disclosed herein.

FIG. 6 illustrates an example timing diagram 600 of transmission of the first interrogation command, the second interrogation command, the third interrogation command, and a fourth interrogation command, according to one or more embodiments described herein.

The example timing diagram 600 includes a master clock cycle 602, a first timing signal 604 depicting transmission of the first interrogation command, a second timing signal 606 depicting reception of the first response signal, a third timing signal 608 depicting transmission of the second interrogation command, a fourth timing signal 610 depicting reception of the second response signal, a fifth timing signal 612 depicting transmission of the third interrogation command, a sixth timing signal 614 depicting reception of the third response signal, a seventh timing signal 616 depicting transmission of the fourth interrogation command, and an eighth timing signal 618 depicting reception of a fourth response signal.

It can be observed from the example timing diagram 600 that the first RFID reader 102 may cause the transmission of the first interrogation command in the first time interval T1 (as depicted by the first timing signal 604). Additionally, or alternatively, in the first time interval T1, the first RFID reader 102 may receive the first response signal (as depicted by the second timing signal 606).

Further, it can be observed from the example timing diagram 600 that the RFID reader 104 may cause the transmission of the third interrogation command in the second time interval T2 (as depicted by the third timing signal 608). Additionally, or alternatively, in the second time interval T2, the RFID reader 104 may receive the third response signal (as depicted by the fourth timing signal 610).

Furthermore, it can be observed from the example timing diagram 600 that the RFID reader 104 may cause the transmission of the second interrogation command in the first time interval T1 (as depicted by the fifth timing signal 612). In an embodiment, the completion of transmission of the second interrogation command in the first time interval T1 and the start of the transmission of the third interrogation command in the second time interval T2 are separated by a predetermined time period, for example, of about 200 milliseconds. Accordingly, the RFID reader 104 may cause alternating transmission of the second interrogation command and the third interrogation command. Additionally, or alternatively, in the first time interval T1, the RFID reader 104 may receive the second response signal (as depicted by the sixth timing signal 614).

Furthermore, it can be observed from the example timing diagram 600 that a fourth RFID reader may cause the transmission of the fourth interrogation command in the second time interval T2 (as depicted by the seventh timing signal 616). In an embodiment, the completion of transmission of the second interrogation command in the first time interval T1 and the start of the transmission of the fourth interrogation command in the second time interval T2 are separated by the predetermined time period, for example, of about 200 milliseconds. Additionally, or alternatively, in the second time interval T2, the fourth RFID reader may receive the fourth response signal (as depicted by the eighth timing signal 618).

Because the reception of the first response signal may overlap with the transmission of the first interrogation command (transmitted over the first signal), the first response signal may interfere with the first signal. Accordingly, the first noise cancellation unit 210 may remove the noise from the first response signal. Similarly, because the reception of the second response signal may overlap with the transmission of the second interrogation command (transmitted over the second signal), the second response signal may interfere with the second signal. Accordingly, the second noise cancellation unit 312 may remove the noise from the second response signal.

FIG. 7 illustrates a flowchart 700 to operate the RFID reader 104, according to one or more embodiments described herein. At step 702, the RFID reader 104 may include means such as the third processor 318 of the first RFID tag 110, the third communication interface 320, the first antenna element 120, and/or the like for receiving, in a first time interval, a first interrogation command from the first RFID reader 102. In an embodiment, the first antenna element 120 is configured to operate at a first transmit power. At step 704, the RFID reader 104 may include means such as the third processor 318, the third communication interface 320, the first antenna element 120, and/or the like for transmitting, in the first time interval, the first response signal to the first RFID reader 102, in response to receiving the first interrogation command. Because the first interrogation command includes the unique ID of the first RFID tag 110 of the RFID reader 104, the first RFID reader 102 may receive the first response signal from the first RFID tag 110 of the RFID reader 104 that is associated with the unique ID. For example, the first RFID reader 102 may receive the first response signal from the first RFID tag 110 in the RFID reader 104. In some examples, the first response signal may include the first data.

At step 706, the RFID reader 104 may include means, such as the second processor 302, the second communication interface 310, the second RFID reader unit 314, the second antenna element 118, and/or the like for transmitting, in the first time interval, the second interrogation command to the one or more second RFID tags 122 in the vicinity of the RFID reader 104. In an embodiment, the second antenna element 118 is configured to operate at a second transmit power. In an embodiment, the second transmit power of the second antenna element 118 is below the first transmit power of the first antenna element 120. In an embodiment, the second signal including the second interrogation command is transmitted in the second predetermined direction. Accordingly, as and when the second RFID tags 122 pass through the location where the RFID reader 104 directs the second signal, the second RFID tags 122 may receive the second interrogation command.

At step 708, the RFID reader 104 may include means, such as the second processor 302, the second communication interface 310, the second RFID reader unit 314, the second antenna element 118, and/or the like for receiving the second response signal from the one or more second RFID tags 122 in the first time interval, in response to transmitting the second interrogation command. As discussed above, in some examples, the second RFID tags 122 may correspond to passive RFID tags. Accordingly, when the second RFID tags 122 receive the second signal, the second signal may cause the second RFID tags 122 to induce charge. The induced charge may be used by the second RFID tags 122 to power itself (also referred to as power harvesting). Thereafter, the second RFID tags 122 may utilize the induced charge to transmit the second response signal. In some examples, where the second RFID tags 122 may correspond to active RFID tags, the second RFID reader unit 314 may directly transmit the second interrogation command over the second signal. Upon receiving the second interrogation command, the second RFID tags 122 may utilize the power stored in the battery (in the second RFID tag 122) to transmit the second response signal.

In some examples, the second RFID reader unit 314 may be configured to utilize standards such as, but not limited to, EPC global standards to transmit the second interrogation command. For example, the second interrogation command may include "Read" command. Such interrogation command (comprising the "Read" command), when received by an RFID tag, may cause the RFID tag to retrieve and transmit data stored in the RFID tag. For example, upon receiving such interrogation command (comprising the "Read" command), the second RFID tags 122 may retrieve and transmit the second data stored in the second RFID tags 122.

In some examples, the second RFID reader unit 314 may be configured to cause the second antenna element 118 to transmit the second interrogation command (over the second signal) continuously. In another embodiment, the second RFID reader unit 314 may be configured to cause the second antenna element 118 to the transmit second interrogation command (over the second signal) periodically after a predetermined time period. For example, the second RFID reader unit 314 may be configured to cause the second antenna element 118 to transmit the second interrogation command after every 200 milliseconds (ms). In an example embodiment, the second RFID reader unit 314 may be configured to receive the second response signal from the second RFID tags 122, in accordance with the EPC global and/or DOD standards. In some examples, the second response signal may include the second data. In some examples, the second data may correspond to the data stored in the second RFID tags 122. Further, the second RFID reader unit 314 may be configured to store the second data in the first common memory unit 304.

At step 710, the RFID reader 104 may include means such as the third processor 318, the third communication interface 320, the first antenna element 120, and/or the like for transmitting, in the second time interval, a third interrogation command to the first RFID tag 126 of the second RFID reader 134 through the first antenna element 120 operating at the first transmit power. In an embodiment, the second time interval occurs subsequent to the first time interval and may be separated by a predetermined time duration of about 200 ms. In an example embodiment, the second RFID reader unit 314 may cause the first antenna element 120 to transmit the third interrogation command over the third signal. In an example embodiment, the second RFID reader unit 314 may utilize EPC global and the DOD standards to transmit the third interrogation command over the third signal.

In an example embodiment, prior to transmitting the third interrogation command, the second RFID reader unit 314 may be configured to select a second RFID reader (e.g., second RFID reader 134) of the second RFID readers 134, 136, 138, 140, etc. In some examples, the second RFID reader unit 314 may sequentially select the second RFID reader 134 from the list of the second RFID readers 134, 136, 138, 140 stored in the first common memory unit 304. The following table illustrates an example list of the second RFID readers 134, 136, 138, 140 stored on the first common memory unit 304:

TABLE 1

List of the second RFID readers

| List of Second RFID readers | Unique ID | Zone ID | Location |
|---|---|---|---|
| Second RFID reader 134 | 1234567890 | L1 | x: 5, y: 6, z: 10 |
| Second RFID reader 136 | 0987654321 | L2 | X: 7, y: 10, z: 25 |

Referring to Table 1, it can be observed that the list of the second RFID readers 134, 136 may include the unique ID associated with respective first RFID tag associated with the second RFID readers 134, 136. Further, Table 1 depicts a location at which the second RFID readers 134, 136 are positioned with respect to the RFID reader 104. For example, the second RFID reader 134 is located at coordinates (5, 6, 10), while the second RFID reader 136 is located at coordinates (7, 10, 25), with respect to the RFID reader 104. In some examples, the Table 1 further illustrates level ID, where the second RFID readers 134, 136 are installed.

In some examples, the second RFID reader unit 314 may sequentially select the second RFID reader 134 from the list of the second RFID readers (e.g., table 1). Additionally, the second RFID reader unit 314 may be configured to retrieve the unique ID associated with first RFID tag in the selected second RFID reader 134 and the location of the selected second RFID reader 134. Thereafter, the second RFID reader unit 314 may be configured to include the unique ID in the third interrogation command. Further, the second RFID reader unit 314 may cause the first antenna element 120 to direct the third signal in a direction of the retrieved location. Subsequently, the second RFID reader unit 314 transmits the third interrogation command.

In some examples, the scope of the disclosure is not limited to the transmitting the third interrogation signal only based on the coordinates of the second RFID readers 134, 136. In an example embodiment, the RFID reader 104 may transmit the third interrogation signal based on a level in the mesh topology in which the second RFID readers 134, 136 are installed. In an embodiment, the levels in the mesh topology correspond to different zones covered by different RFID readers of the system environment 100. For example, based on the zone in which the second RFID reader 134 (e.g.) is installed, the second RFID reader unit 314 may be configured to retrieve the coordinates at which the second RFID reader 134 is installed. Subsequently, the second RFID reader unit 314 transmits the third interrogation command.

In some examples, the scope of the disclosure is not limited to the third interrogation command only including the unique ID of the first RFID tag 126 included in the second RFID reader 134. In an example embodiment, the second RFID reader unit 314 may further include an address of a memory unit in the second RFID reader 134 where the second RFID reader 134 intends to read the third data. The following table illustrates an example third interrogation command:

TABLE 2

An example third interrogation command

| Command | Unique ID | Address |
|---------|-----------|---------|
| Read | 1234567890 | 34AD |

Accordingly, in an example embodiment, the third interrogation command may be different from the second interrogation command (transmitted at the step 706). For example, in addition to the "Read" command, the third interrogation command may include the unique ID associated with the first RFID tag 126 (included in the selected second RFID reader 134) that is to be interrogated, and/or the address of the memory unit from where the RFID reader 104 intends to read the third data.

In an embodiment, the third processor 318 may cause the first antenna element 120 to transmit the third interrogation command in the second time interval, subsequent to the second processor 302 causing the second antenna element 118 to transmit the second interrogation command in the first time interval. More particularly, the third processor 318 may cause the first antenna element 120 to transmit the third interrogation command during the predetermined time period (i.e., 200 ms). Accordingly, the RFID reader 104 may cause alternating transmission of the second interrogation command and the third interrogation command. FIG. 6 illustrates a timing diagram 600 depicting an example transmission of the second interrogation command and the third interrogation command.

In an embodiment, the second RFID reader unit 314 determines whether the third interrogation signal has been transmitted to each of the second RFID readers 134, 136 in level 2 of the mesh topology of the system environment 100. If the second RFID reader unit 314 determines that the third interrogation command has been transmitted to each of the second RFID readers 134, 136, the second RFID reader unit 314 may be configured to end the execution of the flowchart 700. However, if the second RFID reader unit 314 determines that the third interrogation command has not been transmitted to each of the second RFID readers 134, 136, the second RFID reader unit 314 may be configured to repeat the step 710.

At step 712, the RFID reader 104 may include means such as the third processor 318, the third communication interface 320, the first antenna element 120, and/or the like for receiving, in the second time interval, the third response signal from the second RFID reader 134. In an embodiment, the third response signal comprises third data.

In an embodiment, the first RFID reader 102 receives the first data, the second data, and the third data from the RFID reader 104. In an embodiment, the first RFID reader 102 transmits the first data, the second data, and the third data to the central server 106 via the network 108. In some examples, the second processor 302 may transmit the first data, the second data, and the third data after the second RFID reader unit 314 has interrogated the first RFID tag in each of the second RFID readers 134, 136. In another embodiment, the second processor 302 may transmit the first data, the second data, and the third data as and when the second RFID reader unit 314 receives the third data from the first RFID tag 126 in the second RFID reader 134.

Figure 8:
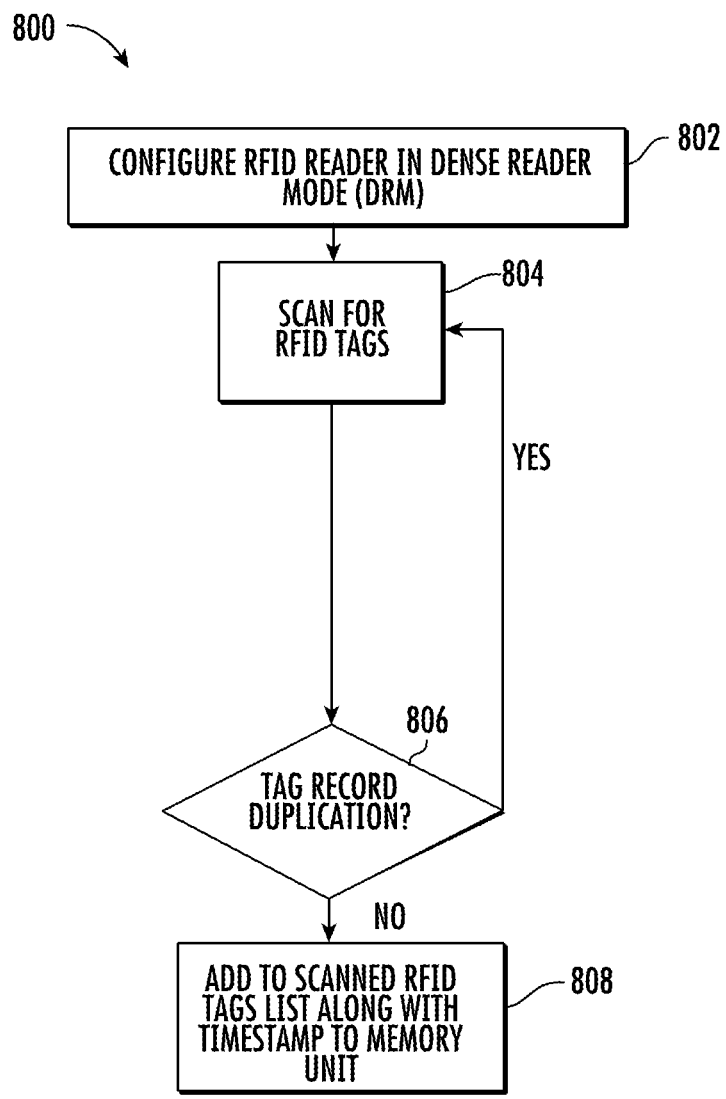
FIG. 8 illustrates a flowchart to operate the slave RFID reader in a dense reader mode (DRM), according to one or more embodiments described herein.

FIG. 8 illustrates a flowchart 800 to operate the RFID reader 104 in the dense reader mode (DRM), according to one or more embodiments described herein.

At step 802, the RFID reader 104 may include means such as the third processor 318 of the first RFID tag 110, the third communication interface 320, the second RFID reader unit 314, the first antenna element 120, the second antenna element 118, and/or the like for configuring the RFID reader 104 in the DRM mode. In an embodiment, as described in conjunction with FIG. 5, the RFID reader 104 operates in the DRM mode to avoid causing interference in the communication of other RFID readers operating in the vicinity of the RFID reader 104.

At step 804, the RFID reader 104 may include means such as the third processor 318 of the first RFID tag 110, the third communication interface 320, the second RFID reader unit 314, the first antenna element 120, the second antenna element 118, and/or the like for scanning for RFID tags, for example, the first RFID tag 126 of the second RFID reader 134 and/or the one or more second RFID tags 122 in the vicinity of the RFID reader 104.

At step 806, the RFID reader 104 may include means such as the third processor 318 of the first RFID tag 110, the third communication interface 320, the second RFID reader unit 314, the first antenna element 120, the second antenna element 118, and/or the like for determining whether the scanned RFID tags correspond to tag records stored in the first common memory unit 304 of the RFID reader 104. If the scanned RFID tags correspond to duplicate entries of the tag records in the first common memory unit 304 of the RFID reader 104, the RFID reader 104 returns to step 804 to scan other RFID tags that may be present in proximity of the RFID reader 104.

At step 808, the RFID reader 104 may include means such as the third processor 318 of the first RFID tag 110, the third communication interface 320, the second RFID reader unit 314, the first antenna element 120, the second antenna element 118, and/or the like for storing data associated with the scanned RFID tags in the first common memory unit 304 of the RFID reader 104, when the scanned RFID tags do not correspond to the tag records stored in the first common memory unit 304 of the RFID reader 104. In an embodiment, the data is timestamped and stored in the first common memory unit 304 of the RFID reader 104.

Figure 9:
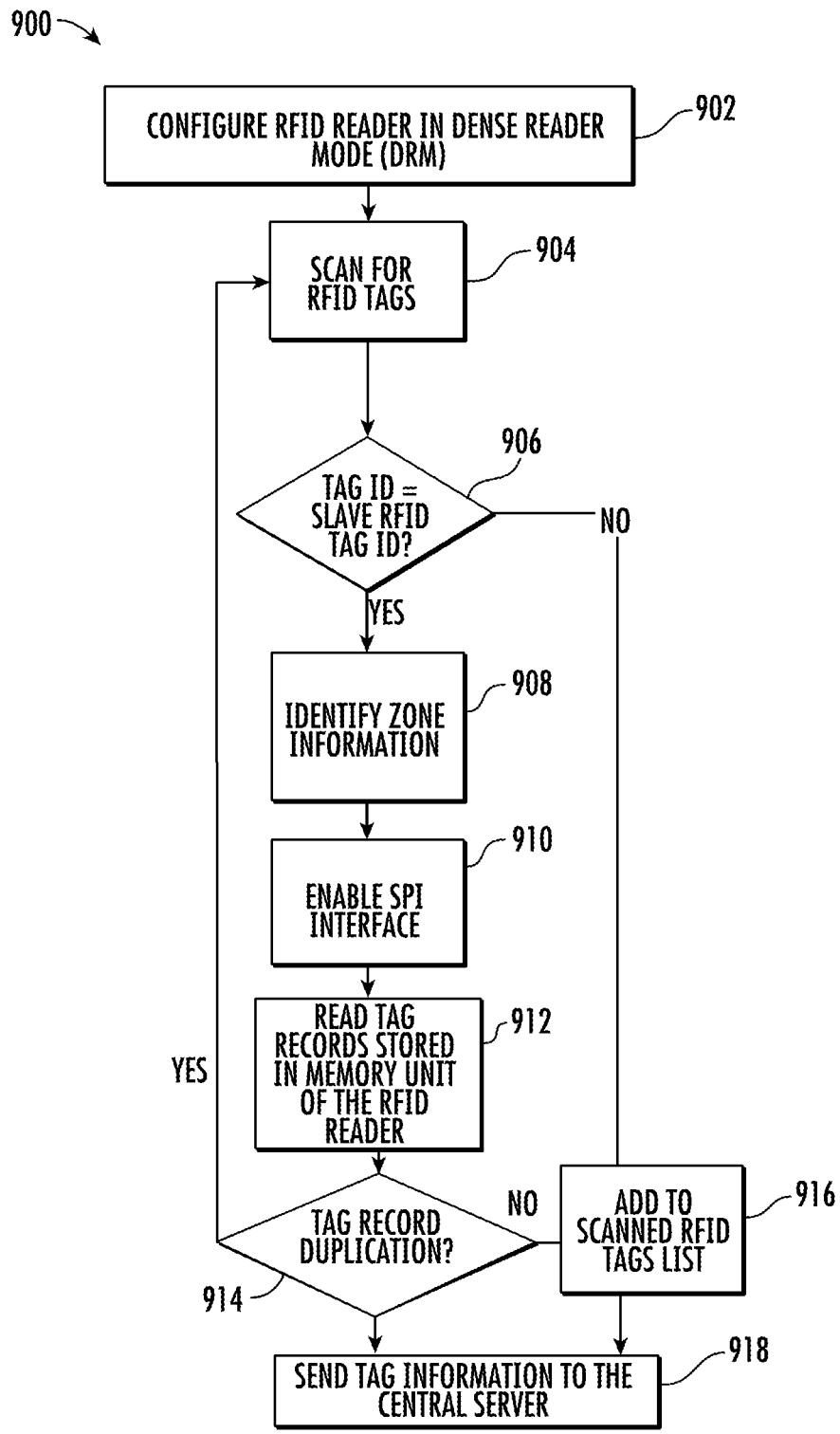
FIG. 9 illustrates a flowchart to operate the master RFID reader in the dense reader mode (DRM), according to one or more embodiments described herein.

FIG. 9 illustrates a flowchart 900 to operate the first RFID reader 102 in the dense reader mode (DRM), according to one or more embodiments described herein.

At step 902, the first RFID reader 102 may include means such as the first processor 202, the first communication interface 206, the first RFID reader unit 208, the first antenna element 114, the second antenna element 116, and/or the like for configuring the first RFID reader 102 in the DRM mode. In an embodiment, as described in conjunction with FIG. 5, the first RFID reader 102 may operate in the DRM mode to avoid causing interference in the communication of other RFID readers operating in the vicinity of the first RFID reader 102.

At step 904, the first RFID reader 102 may include means such as the first processor 202, the first communication interface 206, the first RFID reader unit 208, the first antenna element 114, the second antenna element 116, and/or the like for scanning for RFID tags, for example, the first RFID tag 110 of the RFID reader 104 and/or the one or more second RFID tags 112 in the vicinity of the first RFID reader 102.

At step 906, the first RFID reader 102 may include means such as the first processor 202, the first communication interface 206, the first RFID reader unit 208, the first antenna element 114, the second antenna element 116, and/or the like for determining whether a tag ID of the scanned RFID tags corresponds to a slave RFID tag ID. If the tag ID of the scanned RFID tag does not correspond to a slave RFID tag ID, then the tag ID is added to a scanned RFID tags list stored in the first memory unit 204 of the first RFID reader 102. In an embodiment, the scanned RFID tags list stores a list of second RFID tags 112 that are located in the vicinity of the first RFID reader 102. If the tag ID of the scanned RFID tag corresponds to a slave RFID tag ID, then the process proceeds to step 908.

At step 908, the first RFID reader 102 may include means such as the first processor 202, the first communication interface 206, the first RFID reader unit 208, the first antenna element 114, the second antenna element 116, and/or the like for identifying zone information associated with the scanned RFID tags. In an embodiment, the zone information indicates a zone of the mesh topology associated with the first RFID tag of a corresponding RFID reader and/or the second RFID tag.

At step 910, the first RFID reader 102 may include means such as the first processor 202, the first communication interface 206, the first RFID reader unit 208, the first antenna element 114, the second antenna element 116, and/or the like for enabling an SPI interface of the first RFID reader 102 to allow communication between different components of the first RFID reader 102, for example, the first processor 202, the first memory unit 204, the first communication interface 206, the first RFID reader unit 208, the first noise cancellation unit 210, the first power source unit 212, the first antenna element 114, and/or the second antenna element 116.

Once the SPI interface is enabled, at step 912, the first RFID reader 102 may include means such as the first processor 202, the first communication interface 206, the first RFID reader unit 208, the first antenna element 114, the second antenna element 116, and/or the like for reading the tag records stored in the first memory unit 204 of the first RFID reader 102.

At step 914, the first RFID reader 102 may include means such as the first processor 202, the first communication interface 206, the first RFID reader unit 208, the first antenna element 114, the second antenna element 116, and/or the like for determining whether the scanned RFID tags correspond to tag records stored in the first memory unit 204 of the first RFID reader 102. If the scanned RFID tags correspond to duplicate entries of the tag records in the first memory unit 204 of the first RFID reader 102, the first RFID reader 102 proceeds to step 918 to send tag information of the scanned RFID tags to the central server 106 via the network 108 and scan other RFID tags that may be present in proximity of the first RFID reader 102.

At step 916, the first RFID reader 102 may include means such as the first processor 202, the first communication interface 206, the first RFID reader unit 208, the first antenna element 114, the second antenna element 116, and/or the like for storing the tag information associated with the scanned RFID tags in the first memory unit 204 of the first RFID reader 102, when the scanned RFID tags do not correspond to the tag records stored in the first memory unit 204 of the first RFID reader 102. In an embodiment, the data is timestamped and stored in the first memory unit 204 of the first RFID reader 102.

Referring back to FIG. 1, FIG. 2, and FIG. 3, it can be observed that the first RFID reader 102 corresponds to master RFID reader, while the RFID reader 104 corresponds to a slave RFID reader. Further, the RFID reader 104 acts as a master RFID reader for the second RFID reader 134. Accordingly, the second RFID reader 134 corresponds to the slave RFID reader. During deployment of the one or more RFID readers (e.g., 102, 134, and 104) in the system environment 100, each of the one or more RFID readers (e.g., 102, 134, and 104) may be configured to store a list of the RFID readers that are slave to the respective one or more RFID reader (e.g., 102, 134, and 104). For example, the first RFID reader 102 may include the list of the RFID readers comprising the RFID reader 104 and the RFID reader 124. More particularly, the list of RFID readers includes the RFID tag ID of the RFID readers (104, 124). Similarly, the RFID reader 104 includes the list of RFID readers comprising the RFID tag ID for the RFID reader 134.

Such a network of the RFID readers may allow the first RFID reader 102 to get data from the remaining RFID readers (e.g., 104, 134). For example, the first RFID reader 102 may receive the data from the RFID reader 104 by interrogating the RFID tag 110 in the RFID reader 104. The data (received from the RFID reader 104) includes the data obtained from the one or more second RFID tags 122 and the RFID tag 126 of the second RFID reader 134. The data further includes the data obtained by the second RFID reader 134 from the one or more second tags 142 and 144. A person having ordinary skills in the art would appreciate that the one or more second RFID tags 112, 122, 142, and 144 may be installed on the one or more assets to tracked in the system environment 100. Additionally, a set of second RFID tags of the one or more second RFID tags 112, 122, 142, and 144 may be installed on the proximity sensors and one or more workers working the system environment 100. The proximity sensor may correspond to motion sensor that may get activated when motion of the one or more workers is detected. Such information pertaining to the activation of the proximity sensor is stored in the correspond RFID tag. Accordingly, the first RFID reader 102, the RFID reader 104, and the second RFID reader 134 may obtain the data pertaining to the tracking of the one or more workers within the system environment 100 from set of second RFID tags of the one or more second RFID tags 112, 122, 142, and 144 associated with the one or more workers and/or the proximity sensors. In some examples, the set of second tags associated with the one or more workers and/or the proximity sensor may have a string in the tag ID. For Example, the Tag ID of a second RFID tag associated a worker includes a string "H1A"

For the purpose of brevity, hereinafter, interrogating the RFID tag in an RFID reader has been interchangeably referred to as interrogating the RFID reader.

Further, referring to FIG. 6, the RFID reader 104 receives the first interrogation command from the first RFID reader 102 during the first time interval. Additionally, the RFID reader 104 may be configured to transmit the second interrogation command to the one or more second RFID tags 122 during the first time interval. Further, the RFID reader 104 may be configured to transmit the third interrogation command to the RFID reader 134 during the second time interval. To this end, the RFID reader 104 may be configured to alternate between transmission of the second interrogation command and the third interrogation command during subsequent time intervals. However, the scope of the disclosure is not limited to the RFID reader 104 alternating between the transmission of the second interrogation command and the third interrogation command. In some examples, the RFID reader 104 may be configured to transmit the second interrogation command to the one or more second RFID tags (122A, 122b, and 122C) during two subsequent time intervals (i.e., the first time interval and the second time interval). Thereafter, during the third time interval, the RFID reader 104 may be configured to transmit the third interrogation command. Similarly, the person having ordinary skills in the art can derive other patterns of transmitting the second interrogation command and the third interrogation command during different time intervals.

As discussed, in some examples, the RFID reader 104 may include a single antenna that is shared between the RFID tag 110 and the second RFID reader unit 314. In such an embodiment, the second processor 302 may be configured to implement TDMA to enable the RFID tag 110 and the second RFID reader unit 314 to use the common antenna element (e.g., the first antenna element 120). To this end, the second processor 302 may receive the first interrogation command during the first time interval. Further, during the first time interval, the second processor 302 may transmit the response to the first interrogation command to the first RFID reader 102. During the second time interval, the second processor 302 may be configured to transmit the second interrogation command to the one or more second RFID tags (122A, 122B, and 122C). Further, during the second time interval, the second processor 302 may be configured to receive the response from the one or more second RFID tags (122A, 122B, and 122C). Additionally or alternatively, the second processor 302 may be configured to transmit the third interrogation command to the second RFID reader 134 during the third time interval. More particularly, the second processor 302 may be configured to transmit the third interrogation command to the RFID tag in the second RFID reader 134 during the third time interval. Further, during the third time interval, the second processor 302 may be configured to receive the response from the second RFID reader 134.

In some examples, a duration of the first time interval, the second time interval, and the third time interval may be different. For example, the duration of the third time interval and the first time interval may be greater than the second time interval. Such variation in the duration of the first time interval, the second time interval, and the third time interval may be to accommodate reception/transmission of varied sized data to/from the RFID readers. For example, a size of the data to be received from the second RFID reader 134 may be greater than the size of the data to be received from the one or more second RFID tags (122A, 122B, and 122C). Accordingly, the duration of the second time interval may be less than the duration of the third time interval.

A person having ordinary skills in the art would appreciate that scope of the disclosure is not limited to the RFID reader 104 defining the TDMA slots for transmitting/receiving the data. Similar to the RFID reader 104, the first RFID reader 102 and the second RFID reader 134 may also define the TDMA slots for the transmitting/receiving the data (e.g., the interrogation command and/or response of the interrogation command). In some examples, the TDMA slots may be defined during the deployment of the first RFID reader 102, the second RFID readers 134, and the RFID reader 104 in the system environment 100.

Figure 10:
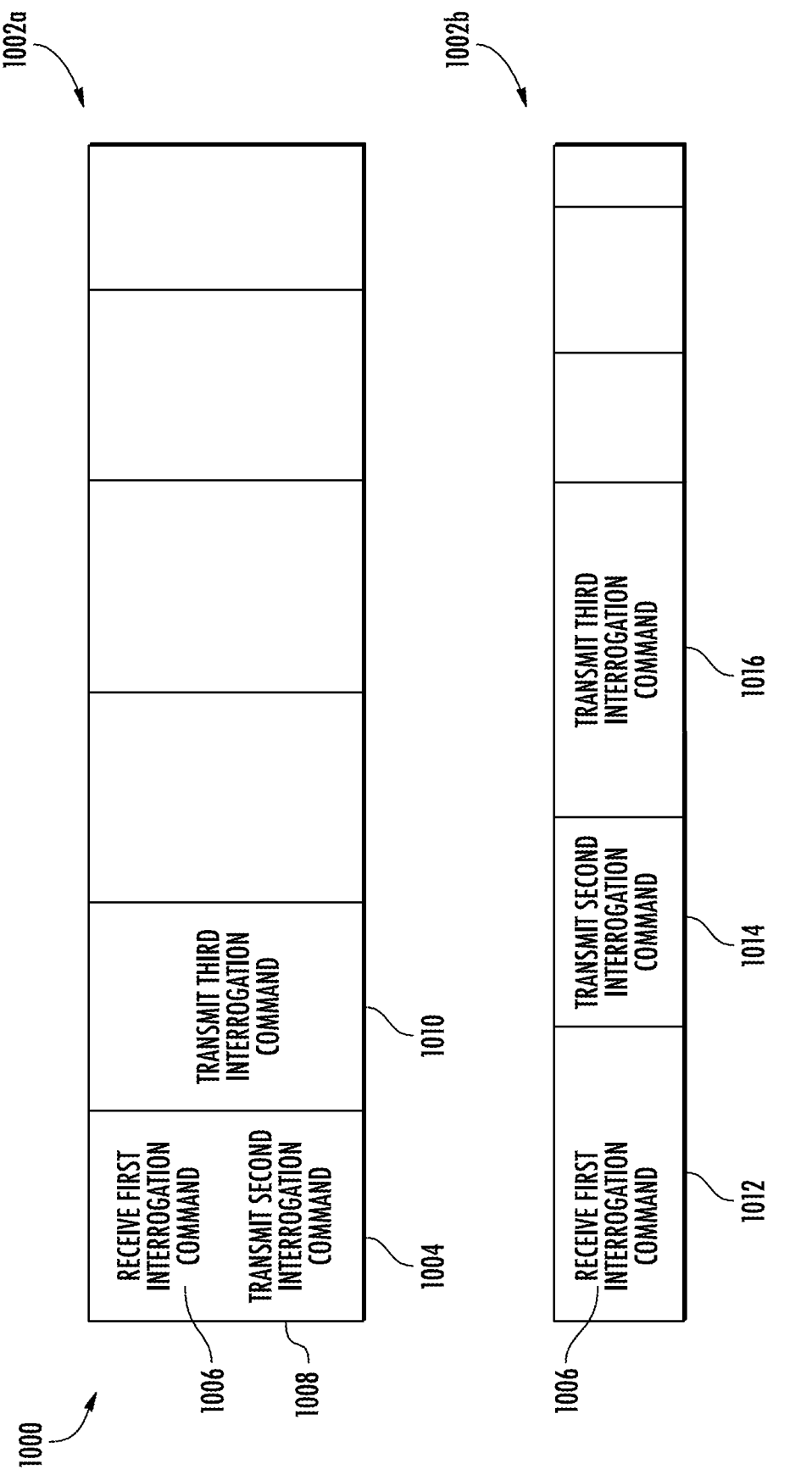
FIG. 10 illustrates a schematic diagram of TDMA slots defined by the RFID reader, according to one or more embodiments described herein.

FIG. 10 illustrates a schematic diagram 1000 of TDMA slots defined by the RFID reader 104, according to one or more embodiments described herein. The schematic diagram 1000 illustrates TDMA slots 1002a, and 1002b. Referring to TDMA slots 1002a, the first slot 1004 depicts the first time interval during which the RFID reader 104 receives the first interrogation command from the first RFID reader 102 (depicted by 1006) and the transmit the second interrogation command to the one or more second RFID tags 122 (depicted by 1008). As discussed, the RFID reader 104 is able to perform the operation of receiving the first interrogation command and transmitting the second interrogation command concurrently since different antenna elements (i.e., the first antenna element 120 and the second antenna element 118) are used to transmit/receive the respective commands. The second slot 1010 corresponds to the second time interval during which the RFID reader 104 is configured to transmit the third interrogation command to the second RFID reader 134. It can be further observed that the time duration of the first time slot 1004 is same as the second time slot 1010.

Referring to the TDMA slot 1002b, the first slot 1012 depicts the first time interval during which the RFID reader 104 receives the first interrogation command from the first RFID reader 102 (depicted by 1006). The second slot 1014 depicts the second time interval during which the RFID reader 104 transmits the second interrogation command to the one or more second RFID tags 122 (depicted by 1008). The third slot 1016 corresponds to the third time interval during which the RFID reader 104 is configured to transmit the third interrogation command to the second RFID reader 134. It can be further observed that the time duration of the first time slot 1012 and the third time slot 1016 is greater than the second time slot 1014. In some examples, the TDMA slots 1002b corresponds to the embodiment when the RFID reader 104 has a single antenna that is shared between the RFID tag 110 and the second RFID reader unit 314.

In an example embodiment, the system environment 100 may be utilized to track workers during hazardous scenarios such as, but not limited to, fire scenarios. In such an embodiment, the central server 106 may be connected to one or more sensors (not shown) throughout the system environment 100. In some examples, the one or more sensors include one or more of gas sensors, fire sensors, infra-red sensors, and/or the like. The one or more sensors may be configured to monitor brewing of hazardous scenarios (such as fire) in the system environment 100. In an instance in which the one or more sensors detects the hazardous scenarios, the one or more sensors may be configured to transmit a message to the central server 106. Thereafter, the central server 106 may be configured to transmit emergency message to the RFID readers in the system environment 100 to configure the RFID readers in the system environment 100 in the emergency mode. One or more methods of operating the RFID readers in the emergency mode is described in conjunction with FIG. 11.

Figure 11:
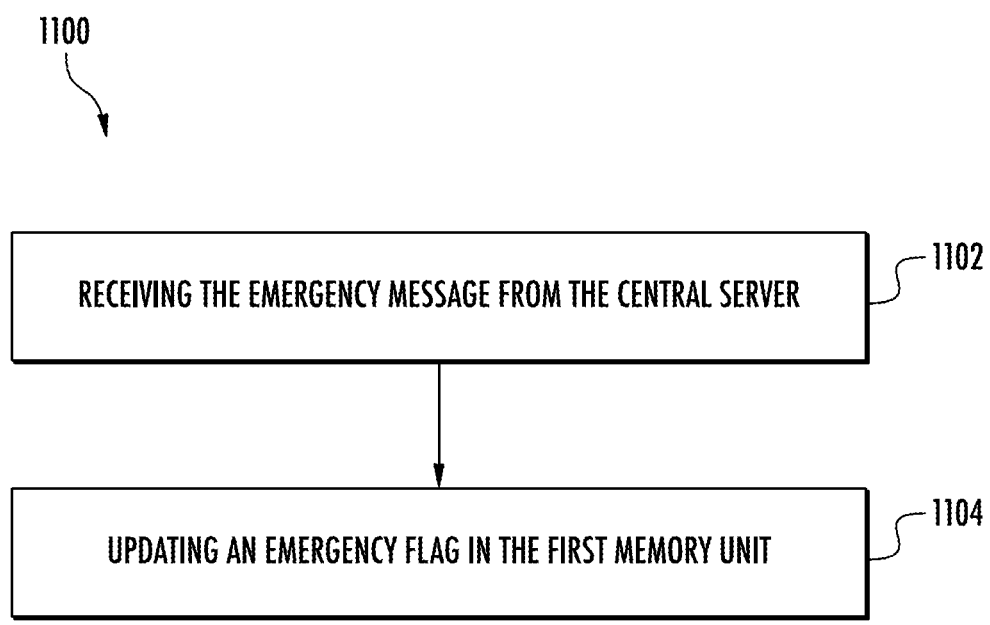
FIG. 11 illustrates a flowchart of a method for operating the RFID reader, according to one or more embodiments illustrated herein.

FIG. 11 illustrates a flowchart 1100 of a method for operating the RFID reader 102, according to one or more embodiments illustrated herein.

At step 1102, the first RFID reader 102 includes means such as, but not limited to, the first processor 202, the first memory unit 204, the first communication interface 206, and/or the like, for receiving the emergency message from the central server 106. As discussed, the emergency message is indicative of the hazardous scenario within the system environment 100.

At step 1104, the first RFID reader 102 includes means such as, but not limited to, the first processor 202, the first memory unit 204, the first communication interface 206, and/or the like, for updating an emergency flag in the first memory unit 204. More particularly, the first processor 202 may be configured to set a value of the emergency flag as "1". In an example embodiment, the emergency flag may be indicative of reception of the emergency message from the central server 106. For example, if the value of the emergency flag is "1", the first processor 202 may determine that the one or more sensors have detected the hazardous scenario in the system environment 100. However, if the value of the emergency flag is "0", the first processor 202 may determine that operations in the system environment 100 are normal.

Figure 12:
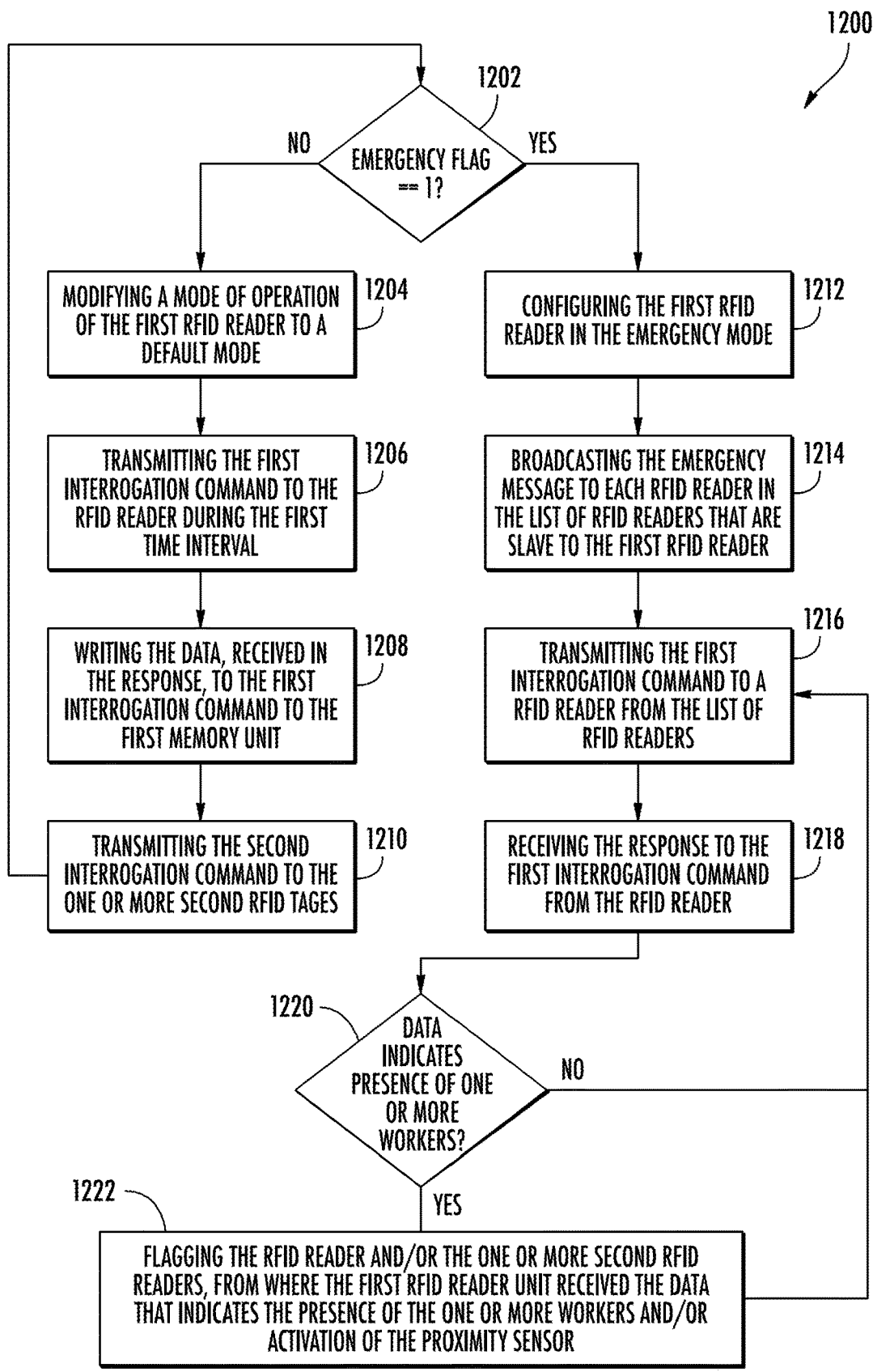
FIG. 12 illustrates a flowchart of a method for operating the RFID reader, according to one or more embodiments illustrated herein.

FIG. 12 illustrates a flowchart 1200 of a method for operating the RFID reader 102, according to one or more embodiments illustrated herein.

At step 1202, the first RFID reader 102 includes means such as, but not limited to, the first processor 202, the first memory unit 204, and/or the like, for checking whether the value of the emergency flag is "1". As discussed, the value of the emergency flag as "1" may indicate that the hazardous scenario has occurred in the system environment 100. If the first processor 202 determines that the value of the emergency flag is "1", the first processor 202 may be configured to perform the step 1212. However, if the first processor 202 determines that the value of the emergency flag is "0", the first processor 202 may be configured to perform the step 1204.

At step 1204, the first RFID reader 102 includes means such as, but not limited to, the first processor 202, the first memory unit 204, and/or the like, for modifying a mode of operation of the first RFID reader 102 to a default mode. At step 1206, the first RFID reader 102 includes means such as, but not limited to, the first processor 202, the first memory unit 204, the first RFID reader unit 208 and/or the like, for transmitting the first interrogation command to the RFID reader 104 during the first time interval. In some examples, the first RFID reader unit 208 may be configured to transmit the first interrogation command to the first RFID tag 110 in the RFID reader 104 of the one or more RFID readers 104 and 124 (included the in the list of RFID readers that are slave to the first RFID reader 102). More particularly, the first RFID reader unit 208 may be configured to retrieve the list of the RFID readers, from the first memory device 204, that are slave to the first RFID reader 102. Thereafter, the first RFID reader unit 208 may be configured to transmit the first interrogation command to the RFID tag 110 in the RFID reader (e.g., the RFID reader 104) identified from the list of RFID readers (that are slave to the first RFID reader 102). Further, during the first time interval, the first RFID reader unit 208 may be configured to receive the response for the first interrogation command from the first RFID tag 110 in the RFID reader 104. The response includes the data received from the RFID reader 104. The data includes the data stored in the first common memory unit 304 of the RFID reader 104. The data stored in the first common memory unit 304 includes the data that the RFID reader 104 obtained from the one or more second tags 122 and the second RFID readers 136 and 134.

At 1208, the first RFID reader 102 includes means such as, but not limited to, the first processor 202, the first memory unit 204, the first RFID reader unit 208 and/or the like, for writing the data, received in the response, to the first interrogation command to the first memory unit 204. As discussed, the data received from the first RFID tag 110 in the RFID reader 104 includes the data received from the one or more second RFID tags 122 proximal to the RFID reader 104 and the data further obtained from the respective slave RFID readers (i.e., the second RFID readers 134 and 136). Accordingly, the RFID reader 102 may receive the data from each RFID reader deployed in the system environment 100.

At 1210, the first RFID reader 102 includes means such as, but not limited to, the first processor 202, the first memory unit 204, the first RFID reader unit 208 and/or the like, for transmitting the second interrogation command to the one or more second RFID tags 112. In some examples, the one or more second RFID tags 112 are positioned proximal to the first RFID reader 102. Further, during the second time interval, the first RFID reader unit 208 may be configured to receive the response from the one or more second RFID tags 112 positioned proximal to the first RFID reader 102. Additionally, the first RFID reader unit 208 may be configured to store the data received from the one or more second RFID tags 112 into the first memory unit 204. Thereafter, the first processor 202 may be configured to repeat the step 1202 for the remaining RFID readers in the list of RFID readers. In some examples, the scope of the disclosure is not limited to transmitting the first interrogation command and the second interrogation command at different steps (i.e., the step 1208 and 1210). In an example embodiment, the first RFID reader unit 208 may be configured to transmit the first interrogation command concurrent to the second interrogation command using the different antenna elements (i.e., the first antenna element 114 and the second antenna element 116).

At step 1212, the first RFID reader 102 includes means such as, but not limited to, the first processor 202, the first memory unit 204, the first RFID reader unit 208 and/or the like, for configuring the first RFID reader 102 in the emergency mode. At step 1214, the first RFID reader 102 includes means such as, but not limited to, the first processor 202, the first memory unit 204, the first RFID reader unit 208 and/or the like, for broadcasting the emergency message to each RFID reader in the list of RFID readers (e.g., the RFID reader 104 and 124) that are slave to the first RFID reader 102. In some examples, the first RFID reader unit 208 may be configured to utilize known protocols such as, but not limited to, EPC protocols, to broadcast the emergency message to the RFID readers (e.g., the RFID readers 104 and 124).

For the purpose of ongoing description, it is assumed that the first RFID reader unit 208 may be configured to receive the data from the RFID reader 104 that further receives the data from the second RFID readers 132 and 134. However, those having ordinary skills in the art would appreciate that the first RFID reader 102 may additionally receive the data from the RFID reader 124 and/or the one or more second RFID readers 138 and 140.

At step 1216, the first RFID reader 102 includes means such as, but not limited to, the first processor 202, the first memory unit 204, the first RFID reader unit 208 and/or the like, for transmitting the first interrogation command to a RFID reader (e.g., the RFID reader 104) from the list of RFID readers that are slave to the first RFID reader 102 during the first time interval. At step 1218, the first RFID reader 102 includes means such as, but not limited to, the first processor 202, the first memory unit 204, the first RFID reader unit 208 and/or the like, for receiving the response to the first interrogation command from the RFID reader 104. As discussed, the response to the first interrogation command includes the data corresponding to the one or more second tags 122 that are proximal to the RFID reader 104. Additionally, the data includes data that RFID reader 104 obtained from the second RFID readers 134 and 136 (that are slave to the RFID reader 104). Since the data received for the second RFID readers 134 and 136 corresponds to the data that the second RFID readers 134 and 136 obtained from the one or more second RFID tags 142 and 144 (that are proximal the second RFID reader 134 and 136). Accordingly, the data received in response to the first interrogation command includes the data corresponding to the one or more second RFID tags 112, 122, 142, and 144. In some examples, the data received by the first RFID reader 102 from the other RFID readers (e.g., 104) may be indexed/flagged based on the RFID reader from which the data has been received. Following table illustrates example data received by the first RFID reader 102:

| Data | RFID reader |
|---|---|
| Data-1 | RFID reader 104 |
| Data-2 | Second RFID reader 134 |
| Data-3 | Second RFID reader 136 |

At step 1220, the first RFID reader 102 includes means such as, but not limited to, the first processor 202, the first memory unit 204, the first RFID reader unit 208 and/or the like, for determining whether the data indicates activation of the proximity sensor and/or presence of the one or more workers. In some examples, the first RFID reader unit 208 may be configured to identify presence of the predefined TAG ID in the data to determine whether the data indicates the presence of the one or more workers and/or activation of the proximity sensor. For example, if the data includes the tag ID "H1A", the first RFID reader unit 208 may determine that the data received from the RFID reader 104 indicates the presence of the one or more workers in the system environment 100. In some examples, activation of the proximity sensor or presence of the data obtained from the one or more second RFID tag associated with the one or more workers may indicate presence of workers in the system environment 100 during hazardous scenario. If the first reader unit 208 determines that the data indicates presence of the one or more workers and/or activation of the proximity sensor, the first reader unit 208 may be configured to perform the step 1218. However, if the first reader unit 208 identifies that the data does not indicates the presence of the one or more workers and/or activation of the proximity sensor, the first reader unit 208 may be configured to repeat the step 1216.

At step 1222, the first RFID reader 102 includes means such as, but not limited to, the first processor 202, the first memory unit 204, the first RFID reader unit 208 and/or the like, for flagging the RFID reader 104 and/or the one or more second RFID readers 134 and 136 from where the first RFID reader unit 208 received the data that indicates the presence of the one or more workers and/or activation of the proximity sensor. Since the data received from the RFID reader 104 and/or the one or more second RFID readers 134 and 136 is indexed based on the RFID reader, the first RFID reader unit 208 is able to identify the RFID reader (of the RFID reader 104 and/or the one or more second RFID readers 134 and 136) that has sent the data indicating the presence of the one or more workers.

Flagging the RFID reader 104 and/or the one or more second RFID readers 134 and 136 may indicate the presence of the one or more worker within the proximity of the RFID reader 104 and/or the one or more second RFID readers 134 and 136. Additionally, the first RFID reader unit 208 may be configured to store the information pertaining to the flagged RFID readers in the first memory unit 204.

Figure 13:
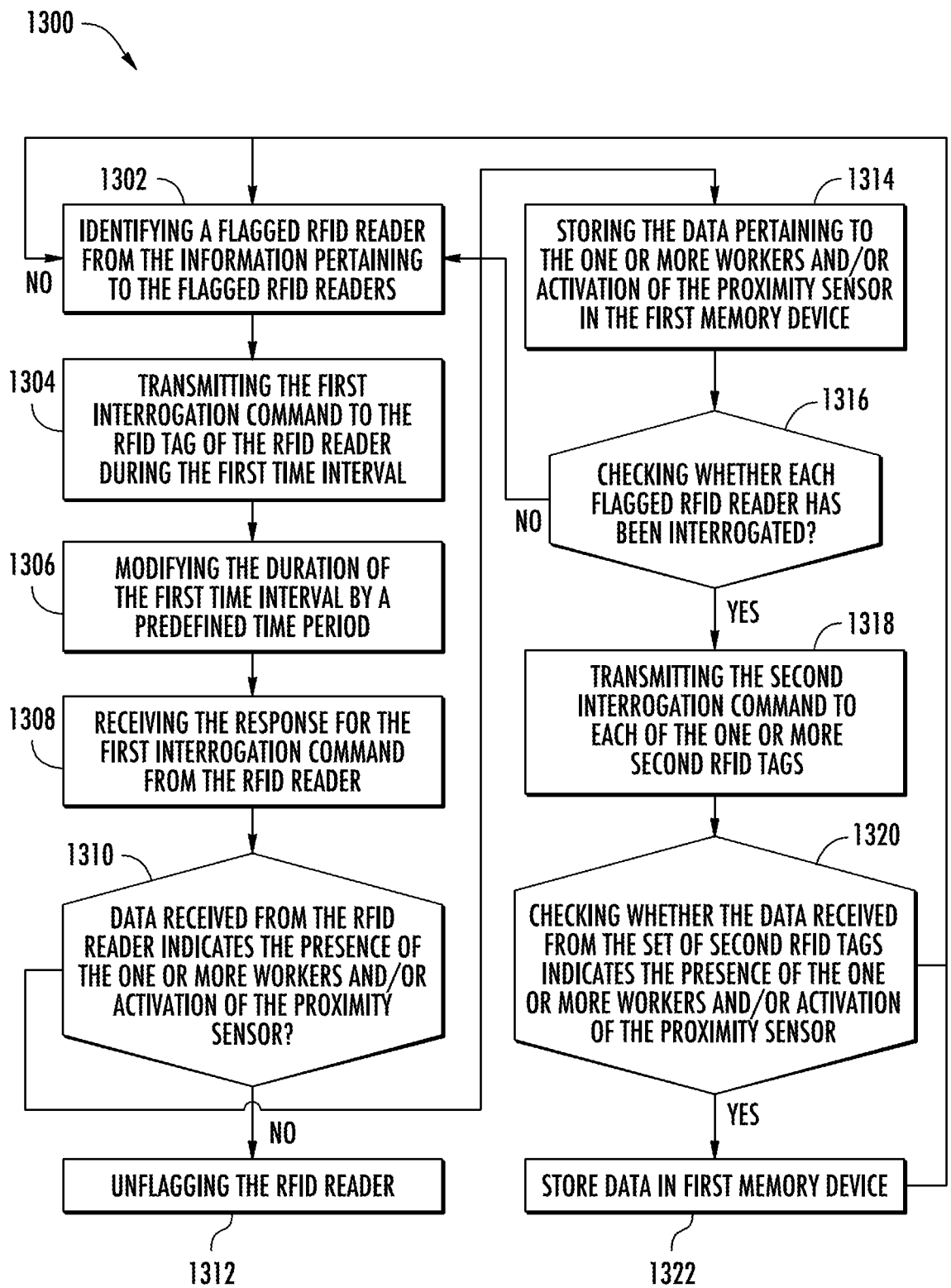
FIG. 13 illustrates another flowchart of a method for operating the first RFID reader, according to one or more embodiments illustrated herein.

FIG. 13 illustrates another flowchart 1300 of a method for operating the first RFID reader 102, according to one or more embodiments illustrated herein.

At step 1302, the first RFID reader 102 includes means such as, but not limited to, the first processor 202, the first memory unit 204, the first RFID reader unit 208 and/or the like, for identifying a flagged RFID reader (e.g., RFID reader 104) from the information pertaining to the flagged RFID readers. At step 1304, the first RFID reader 102 includes means such as, but not limited to, the first processor 202, the first memory unit 204, the first RFID reader unit 208 and/or the like, for transmitting the first interrogation command to the RFID tag 110 of the RFID reader (e.g., the RFID reader 104) during the first time interval. At step 1306, the first RFID reader 102 includes means such as, but not limited to, the first processor 202, the first memory unit 204, the first RFID reader unit 208 and/or the like, for modifying the duration of the first time interval by a predefined time period. For example, the first reader unit 208 may be configured to increase the first time interval by 50 ms. In some examples, the step 1306 is optional and the first RFID reader unit 208 may not modify the first time interval.

At step 1308, the first RFID reader 102 includes means such as, but not limited to, the first processor 202, the first memory unit 204, the first RFID reader unit 208 and/or the like, for receiving the response for the first interrogation command from the RFID reader 104. As discussed, the response for the first interrogation command includes the data that the RFID reader 104 obtained from a set of second RFID tags that are associated with the one or more workers and/or proximity sensors. At step 1310, the first RFID reader 102 includes means such as, but not limited to, the first processor 202, the first memory unit 204, the first RFID reader unit 208 and/or the like, for checking whether the data received from the RFID reader 104 indicates the presence of the one or more workers and/or activation of the proximity sensor. If the first RFID reader unit 208 determines that the data does not indicate the presence of the one or more workers and/or activation of the proximity sensor, the first RFID reader unit 208 may be configured to perform the step 1312. However, if the first reader unit 208 determines that the data received from the RFID reader 104 indicates the presence of the one or more workers and/or activation of the proximity sensor, the first RFID reader unit 208 may be configured to perform the step 1314.

At step 1312, the first RFID reader 102 includes means such as, but not limited to, the first processor 202, the first memory unit 204, the first RFID reader unit 208 and/or the like, for unflagging the RFID reader 104. Thereafter, the first RFID reader unit 208 may be configured to perform step 1316. At step 1314, the first RFID reader 102 includes means such as, but not limited to, the first processor 202, the first memory unit 204, the first RFID reader unit 208 and/or the like, for storing the data pertaining to the one or more workers and/or activation of the proximity sensor in the first memory device 204.

At step 1316, the first RFID reader 102 includes means such as, but not limited to, the first processor 202, the first memory unit 204, the first RFID reader unit 208 and/or the like, for checking whether each flagged RFID reader has been interrogated. If the first RFID reader unit 208 determines that the each of the flagged RFID reader has been interrogated, the first RFID reader unit 208 may be configured to perform the step 1318. However, if the first RFID reader unit 208 determines that each of the flagged RFID reader has not been interrogated, the first RFID reader unit 208 may be configured to repeat the step 1302.

At step 1318, the first RFID reader 102 includes means such as, but not limited to, the first processor 202, the first memory unit 204, the first RFID reader unit 208 and/or the like, for transmitting the second interrogation command to each of the one or more second RFID tags 112. In some examples, the second interrogation command includes tag ID of a set of second RFID tags of the one or more second RFID tags 112. In an example embodiment, the set of second RFID tags corresponds to the tags associated with the proximity sensor and/or the one or more workers. For example, the first RFID reader unit 208 may transmit the second interrogation command as "READ WHERE HEX=H1A". Accordingly, the first RFID reader unit 208 directs the second interrogation command to the set of second RFID tags having "H1A" in the tag ID.

At step 1320, the first RFID reader 102 includes means such as, but not limited to, the first processor 202, the first memory unit 204, the first RFID reader unit 208 and/or the like, for checking whether the data received from the set of second RFID tags indicates the presence of the one or more workers and/or activation of the proximity sensor. In some examples, the first RFID reader unit 208 may determine the presence of the one or more workers based on reception of the response from the set of second RFID tags. If the first RFID reader unit 208 does not receive the response from the set of second RFID tags, the first RFID reader unit 208 may determine that no worker is present in the proximity of the first RFID reader 102. However, if the first RFID reader unit 208 does receive the response from the set of second RFID tags, the first RFID reader unit 208 may determine that worker is present in the proximity of the first RFID reader 102. Accordingly, at step 1322, the first RFID reader unit 208 may be configured to write the data received from the second set of RFID tags in the first memory device 204. Else, the first RFID reader unit 208 may be configured to repeat the step 1302.

In some examples, the central server 106 may be configured to read the data from the first memory device 204 of the first RFID reader 102. As the data indicates the presence of the one or more workers in the system environment 100, the central server 106 may be configured to utilize the data to track the one or more workers.

In some examples, the method described in the FIG. 11-13 enable the first RFID reader unit 208 to the reassign the TDMA slot to interrogate the flagged RFID readers. Accordingly, the first RFID reader 102 prioritizes interrogation of the flagged RFID reader to track the one or more workers through the system environment 100. For example, the first RFID reader 102 transmits the first interrogation command during the second time interval for interrogating flagged RFID reader, which was originally (i.e., in the default mode) used for transmitting the second interrogation command for interrogating the one or more second RFID tags. In another example, the first RFID reader 102 transmits the first interrogation command during the third time interval for interrogating flagged RFID reader, which was originally (i.e., in the default mode) used for transmitting the first interrogation command for interrogating an unflagged RFID reader.

In an example embodiment, the RFID reader 104 may be configured to follow similar methodology, as the first RFID reader 102, to operate in the emergency mode. Further similar to the first RFID reader 102, the RFID reader 104 may reassign the TDMA slots to transmit the first interrogation command to the flagged RFID readers (e.g., the second RFID readers 134 and 136) that are slave to the RFID reader 104. On such method of operating the RFID reader 104 in the emergency mode is described in FIG. 14.

Figure 14:
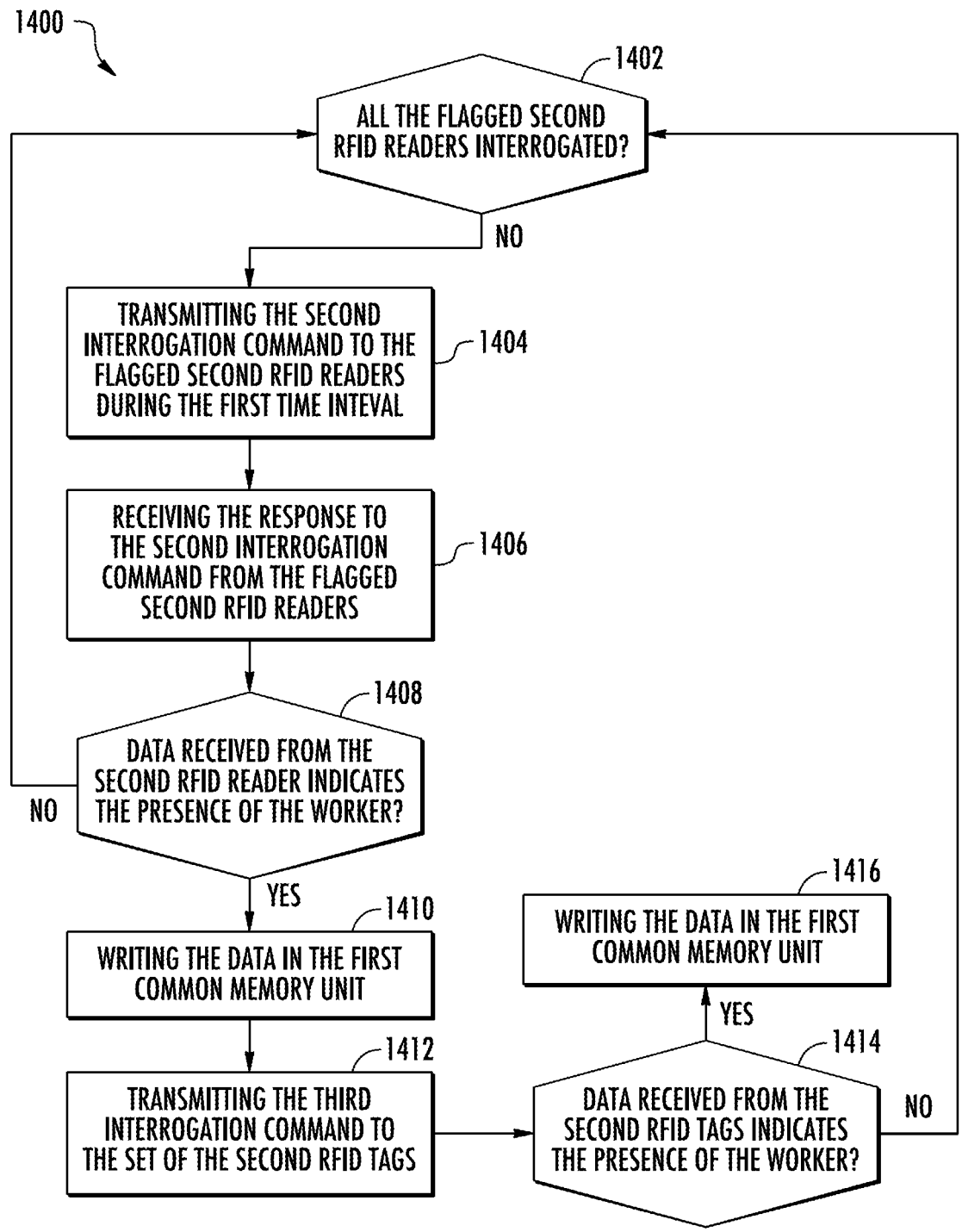
FIG. 14 illustrates a flowchart of a method for operating the RFID reader in the emergency mode, according to one or more embodiments illustrated herein.

FIG. 14 illustrates a flowchart 1400 of a method for operating the RFID reader 104 in the emergency mode, according to one or more embodiments illustrated herein.

At step 1402, the RFID reader 104 includes means such as, the second processor 302, the second communication interface unit 310, the second RFID reader unit 314, and/or the like, for checking whether all the flagged second RFID readers (e.g., 134) have been interrogated. If the second RFID reader unit 314 determines that the all the flagged second RFID readers (e.g., 134) have been interrogated, the second RFID reader unit 314 may be configured to perform the step 1412. However, if the second RFID reader unit 314 determines that not all the second flagged RFID readers have been interrogated, the second RFID reader unit 314 may be configured to perform the step 1404.

At step 1404, the RFID reader 104 includes means such as, the second processor 302, the second communication interface unit 310, the second RFID reader unit 314, and/or the like, for transmitting the second interrogation command to the flagged second RFID readers (e.g., the second RFID reader 134), during the first time interval. At step 1406, the RFID reader 104 includes means such as, the second processor 302, the second communication interface unit 310, the second RFID reader unit 314, and/or the like, for receiving the response to the second interrogation command from the flagged second RFID readers (e.g., the second RFID reader 134), during the first time interval. In an example embodiment, the response to the second interrogation command includes the data that the second RFID reader 134 may have obtained from the set of second RFID tag (e.g., 142). At step 1408, the RFID reader 104 includes means such as, the second processor 302, the second communication interface unit 310, the second RFID reader unit 314, and/or the like, for checking whether the data received from the second RFID reader 104 indicates the presence of the worker within the system environment 100. For example, the second RFID reader unit 314 may determine whether the data includes tag ID associated with the one or more workers. If the second RFID reader unit 314 determines that the data includes the tag ID of the one or more workers, the second RFID reader unit 314 may be configured to determine that the data indicates the presence of the one or more workers. Additionally or alternatively, if the second RFID reader unit 314 may determine that the data indicates that the proximity sensor is activated, the second RFID reader unit 314 may determine that the data indicates the presence of the one or more workers in the system environment 100. Accordingly, the second RFID reader unit 314 may perform the step 1410. However, if the second RFID reader unit 314 determines that the data does not indicate the presence of the one or more workers in the system environment 100, the second RFID reader unit 314 may be configured to repeat the step 1402

At step 1410, the RFID reader 104 includes means such as, the second processor 302, the second communication interface unit 310, the second RFID reader unit 314, and/or the like, for writing the data in the first common memory unit 304. Thereafter, the second RFID reader unit 314 may be configured to repeat the step 1402.

At step 1412, the RFID reader 104 includes means such as, the second processor 302, the second communication interface unit 310, the second RFID reader unit 314, and/or the like, for transmitting the third interrogation command to the set of the second RFID tags 122, as is described in the step 1318. At step 1414, the RFID reader 104 includes means such as, the second processor 302, the second communication interface unit 310, the second RFID reader unit 314, and/or the like, for checking whether the data received from the set of second RFID tags indicates the presence of the one or more workers and/or activation of the proximity sensor. In some examples, the second RFID reader unit 314 may determine the presence of the one or more workers based on reception of the response from the set of second RFID tags. If the second RFID reader unit 314 does not receive the response from the set of second RFID tags, the second RFID reader unit 314 may determine that no worker is present in the proximity of the first RFID reader 102. However, if the second RFID reader unit 314 does receive the response from the set of second RFID tags, the second RFID reader unit 314 may determine that worker is present in the proximity of the first RFID reader 102.

If the second RFID reader unit 314 determines that the data received from the set of second RFID tag does not indicate the presence of the one or more workers, the second RFID reader unit 314 may be configured to repeat the step 1402. If the second RFID reader unit 314 determines that the data received from the set of second RFID tag indicates the presence of the one or more workers, the second RFID reader unit 314 may be configured to perform the step 1416. At step 1416, the RFID reader 104 includes means such as, the second processor 302, the second communication interface unit 310, the second RFID reader unit 314, and/or the like, for writing the data received from the set of second RFID tags in the first common memory unit 304.

Accordingly, from FIG. 14 it can be observed that in the emergency mode, the RFID reader 104 reassign the time interval to interrogate the flagged second RFID readers 134.

Figure 15:
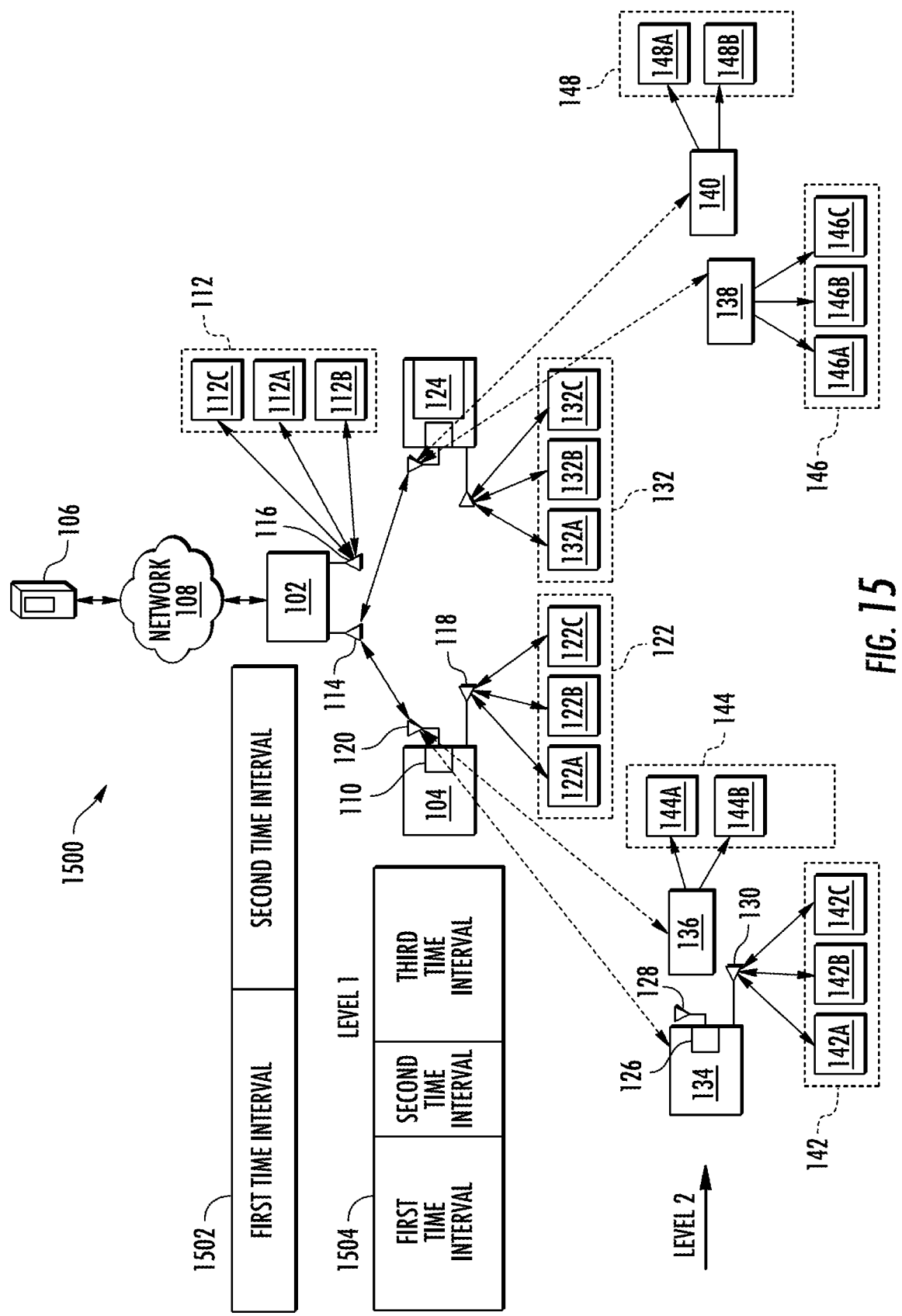
FIG. 15 illustrates an example scenario depicting the communication amongst the first RFID reader, the RFID reader, and the one or more second RFID readers, according to one or more embodiments illustrated herein.

FIG. 15 illustrates an example scenario 1500 depicting the communication amongst the first RFID reader 102, the RFID reader 104, and the one or more second RFID readers 134 and 136, according to one or more embodiments illustrated herein.

Referring to the example scenario 1500, the first RFID reader 102 utilizes the first time interval to transmit the first interrogation command to the RFID reader 104. During the first time interval, the first RFID reader 102 receives the response from the RFID reader 104. Further, the first RFID reader 102 utilizes the second time interval to transmit the second interrogation command to the one or more second RFID tags 112. During the second time interval, the first RFID reader 102 receives the response from the one or more second RFID tags 112. Thereafter, the first RFID reader 102 may be configured to repeat the aforementioned method to interrogate the RFID reader 102 and the one or more second RFID tags 112.

The TDMA slots 1502 depicts the first time interval and the second time interval that the first RFID reader 102 utilizes to transmit the first interrogation command and the second interrogation command. Further, the TDMA slots 1502 depicts the third time interval and the fourth time interval that is utilized to repeat the transmission of the first interrogation command and the second interrogation command.

Further, the example scenario 1500 illustrates that the RFID reader 104 transmits the second interrogation command to the second RFID reader 134 during the first time interval. Additionally, the RFID reader 104 may transmit the third interrogation command to the one or more second RFID tags 122 during the second time interval. Thereafter, the RFID reader 104 may be configured to repeat the aforementioned process in subsequent time intervals for interrogating the second RFID reader 136 and the one or more second RFID tags 122.

The TDMA slots 1504 depicts the first time interval and the second time interval that the RFID reader 104 utilizes to transmit the second interrogation command (to the second RFID reader 134) and the third interrogation command to the one or more second RFID tags 112. Further, the TDMA slots 1504 depicts the third time interval and the fourth time interval that the RFID reader 104 utilizes to transmit the second interrogation command to the second RFID reader 136, and the third interrogation command to the one or more second RFID tags 112.

Figure 16:
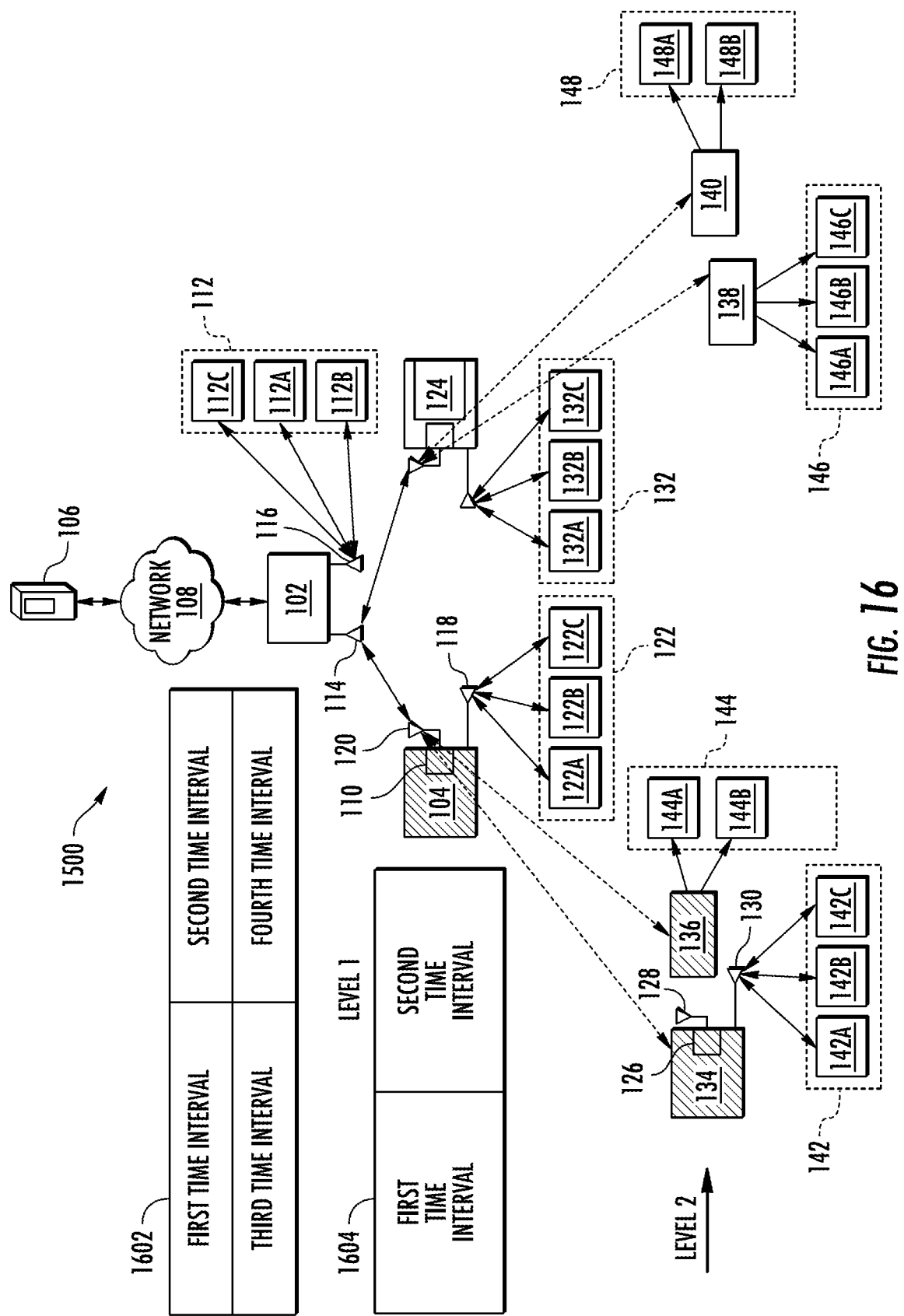
FIG. 16 illustrates an example scenario depicting the communication amongst the first RFID reader, the RFID reader, and the one or more second RFID readers, during the hazardous scenario, according to one or more embodiments illustrated herein.

FIG. 16 illustrates an example scenario 1600 depicting the communication amongst the first RFID reader 102, the RFID reader 104, and the one or more second RFID readers 134 and 136, during the hazardous scenario, according to one or more embodiments illustrated herein.

It can be observed that the RFID reader 104 and the second RFID readers 134 and 136 have been flagged. Referring to the example scenario 1600, the first RFID reader 102 utilizes the first time interval to transmit the first interrogation command to the RFID reader 104. During the first time interval, the first RFID reader 102 receives the response from the RFID reader 104. Further, the first RFID reader 102 utilizes the second time interval to transmit the second interrogation command to the one or more second RFID tags 112. During the second time interval, the first RFID reader 102 receives the response from the one or more second RFID tags 112. Thereafter, the first RFID reader 102 may be configured to repeat the aforementioned method to interrogate the RFID reader 102 and the one or more second RFID tags 112.

The TDMA slots 1602 depicts the first time interval and the second time interval that the first RFID reader 102 utilizes to transmit the first interrogation command and the second interrogation command. Further, the TDMA slots 1602 depicts the third time interval and the fourth time interval that is utilized to repeat the transmission of the first interrogation command and the second interrogation command.

Further, the example scenario 1600 illustrates that the RFID reader 104 transmits the second interrogation command to the second RFID reader 134 during the first time interval. Additionally, the RFID reader 104 may transmit the second interrogation command to the second RFID reader 136 during the second time interval. It can be observed that the second time interval is not being used to interrogated the flagged RFID reader instead of the one or more second RFID tags 112. Thereafter, the RFID reader 104 may be configured to transmit the third interrogation command to the one or more second RFID tags 112 during the third time interval.

The TDMA slots 1604 depicts the first time interval and the second time interval that the RFID reader 104 utilizes to transmit the second interrogation command (to the second RFID reader 134), and the second interrogation command to the second RFID reader 136. Further, it can be observed that the RFID reader 104 may be configured to transmit the third interrogation command during the third time interval.

The foregoing detailed description has set forth various embodiments of the devices and/or processes via the use of block diagrams, flow charts, schematics, exemplary, and examples. Insofar as such block diagrams, flow charts, schematics, and examples contain one or more functions and/or operations, each function and/or operation within such block diagrams, flowcharts, schematics, or examples can be implemented, individually and/or collectively, by a wide range of hardware thereof.

It is noted that each block of the flowchart, and combinations of blocks in the flowchart, may be implemented by various means such as hardware, firmware, circuitry and/or other devices associated with execution of software including one or more computer program instructions. For example, one or more of the procedures described above may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

Embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In one embodiment, examples of the present disclosure may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more processing circuitries (e.g., micro-processing circuitries), as one or more programs running on one or more processors (e.g., microprocessors), as firmware, or as virtually any combination thereof.

In addition, those skilled in the art will appreciate that example mechanisms disclosed herein may be capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

What is claimed is:

1. A first radio-frequency identification (RFID) reader comprising:
   a processor configured to:
      receive an emergency message from a central server;
      broadcast the emergency message to at least one RFID reader proximal to the first RFID reader;
      utilize, a first antenna element to transmit, in a first time interval, a first interrogation command to a RFID tag associated with at least one proximal RFID reader;
      utilize, the first antenna element to receive, in the first time interval, a first response signal from the RFID tag associated with the proximal RFID reader,
      determine, from the first response signal, an indication of activation of a proximity sensor; and
      in response to the activation of the proximity sensor, the processor is further configured to flag the proximal RFID reader to indicate a presence of one or more worker within the proximity of the proximal RFID reader.

2. The first RFID reader of claim 1, wherein the first RFID reader corresponds to a master RFID reader that is configured to be coupled to the central server.

3. The first RFID reader of claim 2, wherein the first RFID reader comprises a first memory unit and the processor is configured to retrieve a list of proximal RFID readers from the first memory unit to identify the proximal RFID reader from the list of proximal RFID readers.

4. The first RFID reader of claim 2, wherein the central server is configured to be coupled to one or more sensors that are configured to detect a hazardous scenario, and in response to the hazardous scenarios, the one or more sensors are configured to transmit the emergency message to the central server.

5. The first RFID reader of claim 4, wherein the central server is configured to receive the emergency message from the one or more sensors and transmit the emergency message to the first RFID reader.

6. The first RFID reader of claim 1, wherein the first response signal comprises:
   a first data that is received by the proximal RFID reader, from one or more first RFID tags that are arranged in a first zone and proximal to the proximal RFID reader;
   a second data that is received by the proximal RFID reader, from a second RFID reader; and
   a third data that is received by the second RFID reader from one or more second RFID tags that are proximal the second RFID reader, wherein the second RFID reader and the one or more second RFID tags are arranged in a second zone, and wherein the processor is further configured to transmit the first data, the second data, and the third data to the central server.

7. The first RFID reader of claim 1, further comprises a first RFID reader unit communicatively coupled with a first communication interface and configured to control the first communication interface to modulate the first interrogation command over a first signal, wherein the first signal is generated by the first antenna element.

8. The first RFID reader of claim 6, wherein the processor configured to:
   determine, from the first response signal, an indication of activation of a proximity sensor in the first zone and/or in the second zone; and
   flag the proximal RFID reader in the first zone and/or flag the second RFID reader in the second zone.

9. The first RFID reader of claim 6, wherein in response to the received emergency message indicative of a hazardous scenario, the processor is further configured to update an emergency flag, wherein the emergency flag is indicative of reception of the emergency message from the central server.

10. The first RFID reader of claim 9, wherein in response to the received emergency message indicative of the hazardous scenario, the processor is further configured to operate the first RFID reader in an emergency mode.

11. The first RFID reader of claim 9, wherein the processor is further configured to flag the proximal RFID reader in the first zone and/or flag the second RFID reader in the second zone to indicate presence of one or more worker within the proximity of the proximal RFID reader and/or the second RFID reader.

12. The first RFID reader of claim 9, wherein the processor is further configured to store information pertaining to the flagged proximal RFID reader and/or flagged second RFID reader.

13. A method comprising:
 receiving an emergency message from a central server;
 broadcasting the emergency message to at least one RFID reader proximal to a first RFID reader;
 utilizing, a first antenna element for transmitting, in a first time interval, a first interrogation command to a RFID tag associated with at least one proximal RFID reader;
 utilizing, the first antenna element for receiving, in the first time interval, a first response signal from RFID tag associated with the proximal RFID reader;
 determining, from the first response signal, an indication of activation of a proximity sensor; and
 in response to the activation of the proximity sensor, flagging the proximal RFID reader to indicate a presence of one or more worker within the proximity of the proximal RFID reader.

14. The method of claim 13, further comprising retrieving a list of proximal RFID readers from a first memory unit for identifying the proximal RFID reader from the list of proximal RFID readers.

15. The method of claim 14, wherein the first RFID reader corresponds to a master RFID reader that is configured to be coupled to the central server.

16. The method of claim 15, further comprising coupling the central server to one or more sensors that are configured for detecting hazardous scenarios, and in response to the hazardous scenarios, the method comprising transmitting the emergency message to the central server and transmitting the emergency message to the first RFID reader.

17. The method of claim 13, wherein, the first response signal comprises:
 a first data received by the proximal RFID reader, from one or more first RFID tags that are arranged in a first zone and proximal to the proximal RFID reader;
 a second data that is received by the proximal RFID reader, from a second RFID reader; and
 a third data that is received by the second RFID reader from one or more second RFID tags that are proximal the second RFID reader, wherein the second RFID reader and the one or more second RFID tags are arranged in a second zone, and the method further comprising transmitting the first data, the second data and the third data to the central server.

18. The method of claim 17, wherein in response to the received emergency message indicative of a hazardous scenario, the method further comprising updating an emergency flag, wherein the emergency flag is indicative of reception of the emergency message from the central server.

19. The method of claim 17, wherein in response to the received emergency message indicative of a hazardous scenario, the method further comprising operating the first RFID reader in an emergency mode.

20. The method of claim 17, wherein flagging the proximal RFID reader in the first zone and/or flagging the second RFID reader in the second zone indicate presence of one or more worker within the proximity of the proximal RFID reader and/or the second RFID reader and the method further comprising storing information pertaining to the flagged proximal RFID reader.

* * * * *